(12) United States Patent
Gonion et al.

(10) Patent No.: US 12,079,142 B2
(45) Date of Patent: Sep. 3, 2024

(54) PC-BASED INSTRUCTION GROUP PERMISSIONS

(71) Applicant: Apple Inc., Cupertino, CA (US)

(72) Inventors: Jeffry E. Gonion, Campbell, CA (US); Bernard J. Semeria, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/343,145

(22) Filed: Jun. 28, 2023

(65) Prior Publication Data

US 2023/0418929 A1 Dec. 28, 2023

Related U.S. Application Data

(60) Provisional application No. 63/356,074, filed on Jun. 28, 2022.

(51) Int. Cl.
*G06F 9/30* (2018.01)
*G06F 12/1027* (2016.01)
(Continued)

(52) U.S. Cl.
CPC ...... *G06F 12/1483* (2013.01); *G06F 9/30076* (2013.01); *G06F 9/30189* (2013.01);
(Continued)

(58) Field of Classification Search
None
See application file for complete search history.

(56) References Cited

U.S. PATENT DOCUMENTS

| 4,376,297 A | 3/1983 | Anderson |
| 5,434,992 A | 7/1995 | Mattson |

(Continued)

FOREIGN PATENT DOCUMENTS

| CN | 111382429 A | 7/2020 |
| KR | 10-2022-0057005 A | 5/2022 |

(Continued)

OTHER PUBLICATIONS

J. Elwell et al., "A Non-Inclusive Memory Permissions architecture for protection against cross-layer attacks," 2014 IEEE 20th International Symposium on High Performance Computer Architecture (HPCA), Orlando, FL, USA, 2014, pp. 201-212.

(Continued)

*Primary Examiner* — Michael Sun
(74) *Attorney, Agent, or Firm* — Kowert, Hood, Munyon, Rankin & Goetzel, P.C.; Dean M. Munyon

(57) ABSTRACT

A permissions model for a processor in which permissions are based on the instruction group of an instruction. These permissions may be stored in permissions tables and indexed using the program counter of the instruction. The permissions may identify which of a plurality of instruction groups of an instruction set architecture (ISA) of a processor are permitted to execute from that program counter value. Accordingly, the instruction group of the instruction can be compared to the permitted instruction groups to determine if the instruction has execution permission. In some cases, the instruction-group-based permissions are secondary execution privileges; additional primary execution permissions that are determined using the program counter may also be used.

20 Claims, 19 Drawing Sheets

(51) Int. Cl.
    *G06F 12/14* (2006.01)
    *G06F 21/52* (2013.01)
(52) U.S. Cl.
    CPC ...... *G06F 12/1027* (2013.01); *G06F 12/1475* (2013.01); *G06F 21/52* (2013.01); *G06F 2221/034* (2013.01)

(56) References Cited

U.S. PATENT DOCUMENTS

| | | | |
|---|---|---|---|
| 5,584,014 | A | 12/1996 | Nayfeh |
| 5,802,602 | A | 9/1998 | Rahman |
| 6,421,761 | B1 | 7/2002 | Arimilli |
| 6,516,387 | B1 | 2/2003 | Auracher |
| 6,629,208 | B2 | 9/2003 | Sturges |
| 6,865,647 | B2 | 3/2005 | Olarig |
| 7,120,651 | B2 | 10/2006 | Bamford |
| 7,287,140 | B1 * | 10/2007 | Asanovic ............ G06F 12/1483 711/208 |
| 7,415,575 | B1 | 8/2008 | Tong |
| 7,509,391 | B1 | 3/2009 | Chauvel et al. |
| 8,108,650 | B2 | 1/2012 | Petolino, Jr. |
| 8,140,820 | B2 | 3/2012 | Mansell et al. |
| 9,213,651 | B2 | 12/2015 | Malyugin et al. |
| 9,852,084 | B1 | 12/2017 | Soderquist et al. |
| 2002/0156962 | A1 | 10/2002 | Chopra et al. |
| 2003/0217229 | A1 | 11/2003 | Rowlands |
| 2005/0066354 | A1 * | 3/2005 | Dellow ............ H04N 21/4623 711/E12.096 |
| 2012/0255015 | A1 | 10/2012 | Sahita et al. |
| 2013/0191611 | A1 * | 7/2013 | Liu .................... G06F 12/1009 711/206 |
| 2013/0262814 | A1 | 10/2013 | Asaro et al. |
| 2014/0331019 | A1 | 11/2014 | Parker et al. |
| 2016/0110298 | A1 | 4/2016 | Koufaty |
| 2016/0350019 | A1 | 12/2016 | Koufaty |
| 2018/0157603 | A1 | 6/2018 | Schulz et al. |
| 2019/0196980 | A1 | 6/2019 | Huang |
| 2019/0377574 | A1 | 12/2019 | Weimer |
| 2020/0050454 | A1 | 2/2020 | Barnes |
| 2020/0073822 | A1 * | 3/2020 | Wallach ............ G06F 12/1009 |
| 2020/0210070 | A1 | 7/2020 | Durham |
| 2021/0064539 | A1 | 3/2021 | Gonion et al. |
| 2021/0150489 | A1 | 5/2021 | Haramati et al. |

FOREIGN PATENT DOCUMENTS

| | | |
|---|---|---|
| TW | 201629763 | 8/2016 |
| TW | 201826122 | 7/2018 |
| TW | 201933112 | 8/2019 |
| WO | 2016064403 | 4/2016 |
| WO | 2018125250 | 7/2018 |
| WO | 2019145667 | 8/2019 |

OTHER PUBLICATIONS

R. Sharifi et al., "CHEx86: Context-Sensitive Enforcement of Memory Safety via Microcode-Enabled Capabilities," 2020 ACM/IEEE 47th Annual International Symposium on Computer Architecture (ISCA), Valencia, Spain, 2020, pp. 762-775.
Office Action in U.S. Appl. No. 18/343,125 mailed Mar. 14, 2024, 12 pages.
International Search Report and Written Opinion in PCT Appl. No. PCT/US2023/026469 mailed Oct. 18, 2023, 10 pages.
Office Action in U.S. Appl. No. 18/343, 125 mailed Jul. 2, 2024, 11 pages.

* cited by examiner

PC-BASED INSTRUCTION GROUP PERMISSIONS

PRIORITY CLAIM

The present application claims priority to U.S. Provisional Application No. 63/356,074, entitled "PC-based Permissions Modifications," filed Jun. 28, 2022, the disclosure of which is incorporated by reference herein in its entirety.

BACKGROUND

Technical Field

Embodiments described herein are related to permissions in processors.

Description of the Related Art

Processors, also known as central processing units (CPUs), are the core components of computing devices that perform a wide range of computational tasks. They are responsible for executing instructions, managing data, and controlling the overall operation of a computer system. Processors are found in various devices, including personal computers, laptops, smartphones, servers, and embedded systems, powering the functionality and performance of these devices.

Permissions play a crucial role in the functioning of processors. A processor's ability to execute tasks efficiently and securely relies on the concept of permissions. Permissions determine what actions and resources are accessible to different components within a system, ensuring the integrity, confidentiality, and availability of data and functionalities. By enforcing permissions, processors ensure that only authorized entities can perform specific operations or access sensitive data, protecting against unauthorized or malicious activities.

BRIEF DESCRIPTION OF THE DRAWINGS

The following detailed description refers to the accompanying drawings, which are now briefly described.

DETAILED DESCRIPTION OF EMBODIMENTS

Figure 1:
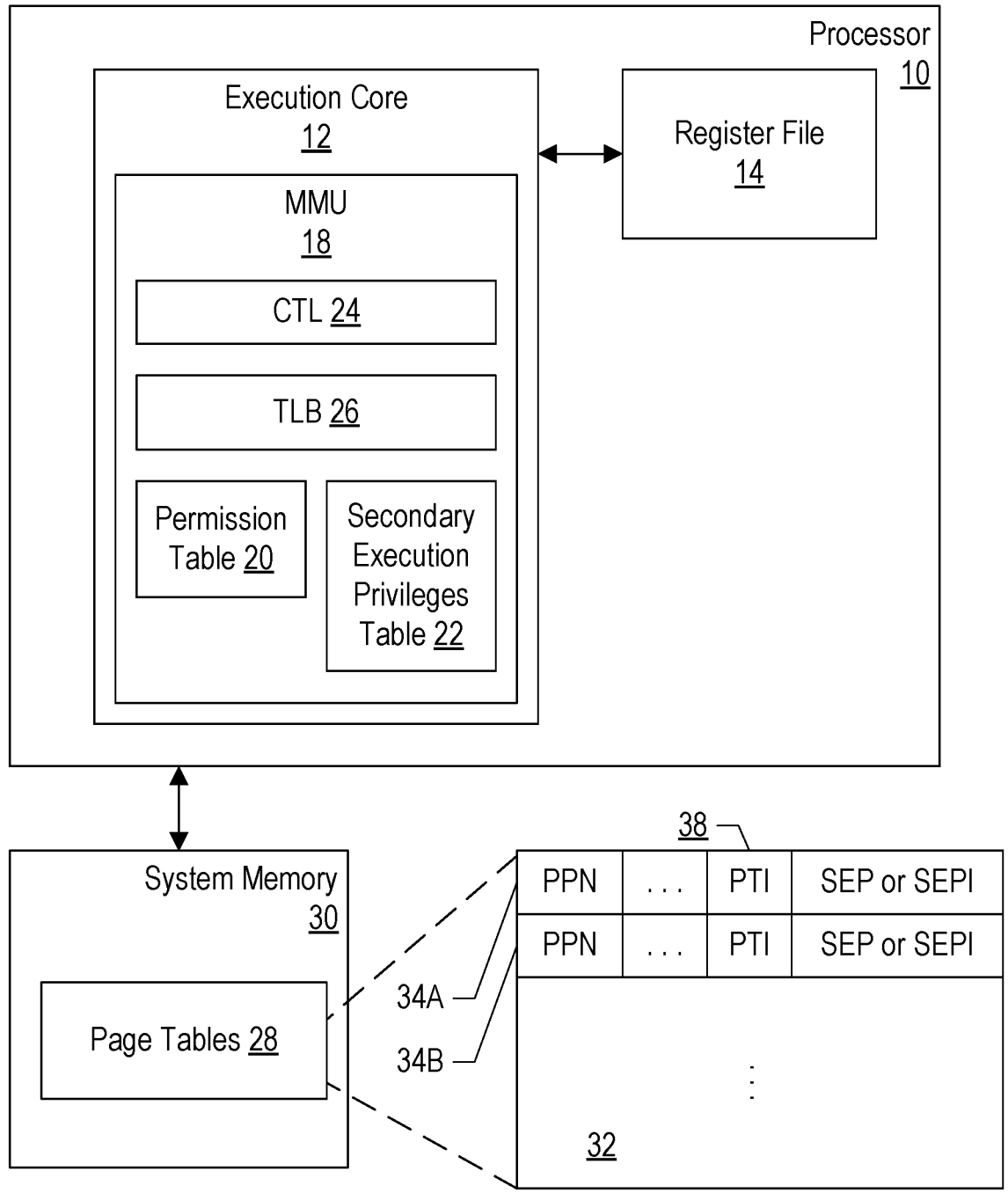
FIG. 1 is a block diagram of one embodiment of a system that includes a processor coupled to a system memory.

Current computer processors typically execute with address translation enabled: the addresses of instructions fetched by the processors and the data addresses accessed by memory-accessing instructions such as loads and stores are virtual addresses, which are then mapped to physical addresses that actually identify the physical memory locations storing the instructions and data. The mapping is performed at a specified granularity, commonly referred to as a "page." Page sizes vary—common sizes include 4 KB, 8 KB, etc.; 1 MB, 2 MB, and 4 MB page sizes may also be used. Generally, though, any page size may be used in various embodiments. Some instruction set architectures (ISAs) define the supported page sizes, while others may leave the definition of the virtual-physical address translation mechanism up to various implementations.

A set of software-managed page tables define the virtual-to-physical address mapping at the page granularity. A virtual address is used to locate an entry in the page table with the physical page number for the page. The least significant bits of the virtual addresses define an offset within a page and are not translated. After translation, the remaining virtual address bits are replaced by a physical page number. Frequently stored virtual-to-physical translation may be cached in translation lookaside buffers (TLBs) throughout the system.

Address translation of the sort provided by a page table provides isolation between different programs running on the same system. It also permits the use of a virtual address space larger than the physical address space by paging data in and out of backing storage of various types (e.g., non-volatile storage, disk drives, solid state drives, etc.). In addition, address translation allows for memory protection at the page level of granularity.

The page table entry for a given page can include permissions to control access to the page. For example, page table permissions may include execute, read, and write permissions. If a page has execute permission, instruction execution is permitted in the page. Thus, if the processor's program counter (PC) is set to an address within the page, the processor will permit instruction fetch and execution from the page. If a page does not have execute permission, an attempt to execute an instruction from the page is not permitted and the processor signals an exception. If a page has read permission, a memory-accessing instruction is permitted to read data from the page (e.g., a load can be executed). If the page does not have read permission, a memory-accessing instruction attempting to read the page will cause an exception for the processor. Similarly, a page that has write permission can be written by a memory-accessing instruction (e.g., a store). In contrast, a write by a memory-accessing instruction to a page that does not have write permission will cause an exception.

Additionally, some instructions in the ISA may be reserved for execution at a specific privilege level, which is typically determined at the time the instruction is executed. Most software executes at a relatively low level of privilege, preventing the software from accessing and/or updating critical processor state and other protected resources (thus helping ensure security in the system). In many cases, such software cannot execute instructions that are restricted to higher levels of privilege. Parts of the operating system that do access/change such state, on the other hand, may execute at higher privileged levels. The number of privilege levels and the instructions that can be executed at each privilege level varies from ISA to ISA.

Because many of the permissions are stored in page tables and/or restricted to access at higher privilege levels, dynamically changing the levels is slow, particularly when cached copies of translations are stored in multiple TLBs throughout a computer system. To change page permissions in such a scenario, any corresponding TLB entries would need to be invalidated, which involves synchronization of the processors in the system. The TLBs could then reload the updated translation from memory (including the permissions update, which may be the only information that was changed).

In the case of page-table based permissions, the permissions are also at a coarse level of granularity, such that all instructions at a given page may share the same permissions, for example. These mechanisms are insufficient to support certain types of software security models.

This disclosure describes permission modifications using one or more permission tables, based on the PC of the instruction. For example, in one embodiment, memory accessing instructions such as loads and stores may access a permission table based on a primary permission table index and a secondary permission table index. The primary permission table index may be provided from the page table entry that provides the translation for the page being accessed (e.g., the location specified by a load instruction). The secondary permission table index may be provided from the page table entry that provides the translation for the PC of the instruction. The processor may be configured to combine the primary and secondary permission table indexes to generate a combined permission table index. The combined permission table index may be used to access the permission table, to obtain the permissions for the memory access. Thus, different memory-accessing instructions (stored, e.g., in different pages) may have different permissions for a given memory address. This paradigm allows different processes (executing from different pages) that share the same virtual address space to have different permissions for a given memory address. For example, a first process may have read and write access to the memory address, while a second process may have read-only access to the memory address.

In one embodiment, the primary and secondary permission table indexes may be combined via concatenation to form the combined permission table index. Other embodiments may use other types of operations, such as an arithmetic operation (e.g., addition, subtraction, etc.) or a logic operation (e.g., exclusive OR, shift, etc.).

This disclosure contemplates various possible ways to arrive at final permissions for a memory-accessing instruction that accesses a particular address. In one embodiment, the permission table may store the permissions for the memory-accessing instruction to access the address. In an alternative embodiment, the permission table may store a value that may be used to reduce primary permissions assigned to the address being accessed. For example, the page table entry that translates the address being accessed may store primary permissions, and the permissions from the permission table may comprise a mask that is bitwise-ANDed with the primary permissions to determine the final permissions. A bit in the mask that is zero may ensure that a permission (e.g., read, write, or execute) is not permitted. On the other hand, a bit in the mask that is one leaves the primary permission unchanged (e.g., permitted or not permitted). In another embodiment, a primary permission table may be accessed using the primary permissions index and a secondary permission table may be accessed using the secondary permissions index. The resulting permissions may be bitwise-ANDed as mentioned above. In yet another embodiment, the primary permission table may be accessed using the primary permissions index and the secondary permission table may be accessed using the combined permission table index.

The disclosed techniques can also be used, in various implementations, for fine-grained control of branch behavior. For example, a branch at PC1 having a target address at PC2 could be controlled based on a primary permission table index corresponding to PC1 and a secondary permission table index corresponding to PC2. A similar result may also be obtained using other means (e.g., the primary permission table index corresponds to PC2 and the secondary permission table index corresponds to PC1).

Fine-grain control of execution privileges is also contemplated. For example, a secondary execution privileges table may be implemented in the processor, or another field in the page table entry may specify secondary execution privileges. The secondary execution privileges may include execute or no-execute permission for subsets of instructions in the ISA. For example, some or all of the instructions may be divided into subsets, and permissions may be controlled on a subset-by-subset basis. These subsets (or instruction groups, or IGs) may include privileged instructions and/or multiple subsets of privileged instructions, instructions which read or write special purpose registers (even if they are not privileged), and the system call instruction (e.g., the system call instruction may even be its own subset). Any combination of subsets of instructions may be defined and controlled independently using the secondary execution privileges. In an embodiment, the secondary execution privileges may be used to reduce the primary execution privilege. In such an implementation, if the primary execution privilege is no-execute, then no instructions are executable regardless of the secondary execution privileges. Conversely, the primary execution privilege may indicate executability, while the second execution privilege is no-execute, rendering corresponding instructions non-executable. Note that if the processor is not executing in privileged mode, then no privileged instructions are executable even if one or more subsets are indicated as executable in the secondary execution privileges. In an embodiment, at least some instructions are not controlled via secondary execution privileges. That is, some instructions may not be included in any subset, and may be executable as long as the primary permissions include execution.

The permission table may be implemented in any desired fashion. For example, the permission table may be in memory (e.g., dynamic random access memory (DRAM)), local memory on the processor (e.g., static RAM (SRAM)), processor registers, etc. Similarly, the secondary execution privileges table may be implemented in any of the above fashions. In one embodiment, the secondary execution privileges table may be shared with the permission table. In an embodiment, there may be different permission tables for different privilege levels and/or different permission tables for different stages.

FIG. 1 is a block diagram of one embodiment of a system 100 including a processor 10. In the depicted embodiment, the processor 10 includes an execution core 12 coupled to a register file 14. As shown, the execution core 12 may include a memory management unit circuit (MMU) 18, which may in turn include a control circuit 24 coupled to a translation lookaside buffer circuit (TLB) 26, a permission table 20, and a secondary execution privileges table 22. Processor 10 is shown in FIG. 1 as coupled to a memory 30 that may store, during use, a page tables 28 that includes a set of page tables. A portion of page tables 28 is shown in exploded view 32 and includes a set of page table entries such as entries 34A-34B.

Processor 10 may be representative of a general-purpose processor that performs computational operations. For example, processor 10 may be a central processing unit (CPU) such as a microprocessor, a microcontroller, an application-specific integrated circuit (ASIC), or a field-programmable gate array (FPGA). Processor 10 may be a standalone component, or may be integrated onto an integrated circuit with other components (e.g., other processors, or other components in a system on a chip (SOC)). In some cases, processor 10 may be a component in a multichip module (MCM) with other components.

As shown, processor 10 may include execution core 12. Execution core 12 may be configured to execute instructions defined in an ISA implemented by processor 10. Execution core 12 may have any suitable microarchitectural features and implementation features, as desired. For example, execution core 12 may include superscalar or scalar implementations. Execution core 12 may include in-order or out-of-order implementations, and speculative or non-speculative implementations. Execution core 12 may include any combination of the above features. The implementations may include microcode in some embodiments. Execution core 12 may include a variety of execution units, each execution unit configured to execute operations of various types (e.g., integer, floating point, vector, multimedia, load/store, etc.). Still further, execution core 12 may include different numbers of pipeline stages and various other performance-enhancing features such as branch prediction. Similarly, execution core 12 may include one or more of instruction decode units, schedulers or reservations stations, reorder buffers, memory management units, I/O interfaces, etc.

MMU 18 may include a control circuit 24 which is configured to perform address translations, accessing TLB 26 for a given virtual address to determine if the address is a hit in TLB 26 and, if not, performing a table walk in page tables 28 to locate the translation. TLB 26 may cache the physical page number (PPN) of the translation, and various other data from the translation such as permissions, permission table indexes, secondary execution privileges or indexes, etc. Permission table 20 may be a permission table as described above, and may be indexed in some embodiments by a combined permission table index as also discussed above. In other embodiments, there may be more than one permission table 20, accessed by various individual or combined indexes, also as previously discussed. Secondary execution privileges table 22 may be the secondary execution privileges table discussed above as well. Other embodiments may not include the secondary execution privileges table 22. For example, the secondary execution privileges may be immediately included in page tables 28 and cached in TLB 26. Additionally, the secondary execution privileges may be included in permission table 20 alongside the primary permissions, causing all permissions to be stored in a single permissions table.

TLB 26 may have any suitable configuration and size. In some embodiments, TLB 26 may be representative of a plurality of TLBs (e.g., an instruction TLB accessed by PCs during instruction fetch and a data TLB accessed by the memory addresses during execution of memory-accessing instructions). TLB 26 may have multiple levels as well (e.g., a first level TLB backed by a second level TLB, etc.).

Register file 14 includes a set of registers that may be used to store operands for various instructions. Register file 14 may include registers of various data types, based on the type of operand execution core 12 is configured to store in the registers (e.g., integer, floating point, multimedia, vector, etc.). Register file 14 may include architected registers (i.e., those registers that are specified in the ISA implemented by processor 10). Alternatively or in addition, register file 14 may include physical registers (e.g., if register renaming is implemented in execution core 12).

An instruction is an executable entity defined in an ISA implemented by processor 10. There are a variety of ISAs in existence (e.g., the x86 ISA originally developed by Intel, ARM from ARM Holdings, Power and PowerPC from IBM/Motorola, etc.). An ISA defines various aspects of its constituent instructions, including their coding in memory, their operation, and their effect on registers, memory locations, and/or other processor state. A given implementation of an ISA may execute each instruction directly, although its form may be altered through decoding and other manipulation in the processor hardware. Another implementation may decode at least some instructions into multiple instruction operations for execution by the execution units in processor 10. Some instructions may be microcoded, in some embodiments. Accordingly, the phrase "instruction operation" is used herein to refer to an operation that an execution unit in processor 10/execution core 12 is configured to execute as a single entity. Instructions may have a one-to-one correspondence with instruction operations, and in some cases an instruction operation may be an instruction (possibly modified to a form internal to processor 10/execution core 12). Instructions may also have a one-to-more-than-one (one to many) correspondence with instruction operations. An instruction operation can also be referred to as an "op."

Page table entries 34A-34B, in various embodiments, may store a physical page number (PPN), as well as various other translation-related data (illustrated by the ellipses in FIG. 1). Page table entries 34A-34B may also store a permissions table index (PTI) 38, which is a value used to select a particular entry in a permissions table. The PTI may be the primary page table index if the translation is for a data address of a memory-accessing instruction, or may be a secondary page table index if the translation is for a PC of an instruction. Page table entries 34A-34B may also store a secondary execution privileges table index (SEPI) 41. In some embodiments, the page table entries 34A-34B may store the secondary execution privileges (SEP) directly. Although not pictured, a page tables 28 may also include the primary permissions themselves. Accordingly, in various embodiments, page tables 28 can include indications of primary and secondary permissions—these indications can take the form of the permissions themselves or indexes usable to locate the permissions in a permissions table.

Figure 2A:
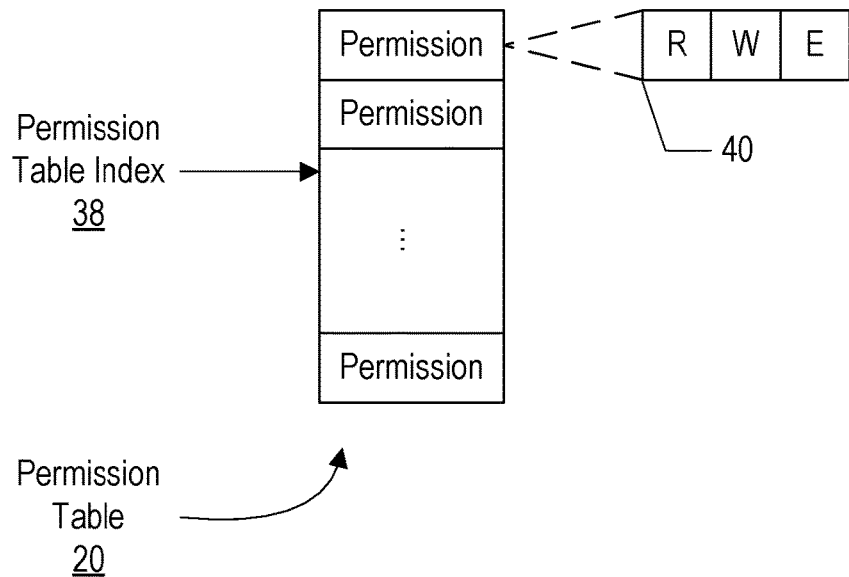
FIGS. 2A-B are block diagrams of a permission table.

FIG. 2A is an example of one embodiment of permission table 20. As shown, permission table 20 may include a plurality of entries indexed by a permission table index 38. In various embodiments, this permission table index may variously be a primary permission table index, a secondary permission table index, or a combined permission table index. An example permission table entry 40 is shown in exploded view and includes a read permission, a write permission, and an execute permission. If permission table index 38 is a primary permission table index or a combined permission table index, permission table entry 40 may store actual permissions. If permission table index 38 is a secondary permission table index, permission table entry 40 may store a mask that is used to mask the actual permissions. Alternatively, if a different permission table provides the actual permissions, reading the permission table 20 with the combined permission table index may provide a mask as well.

Figure 2B:
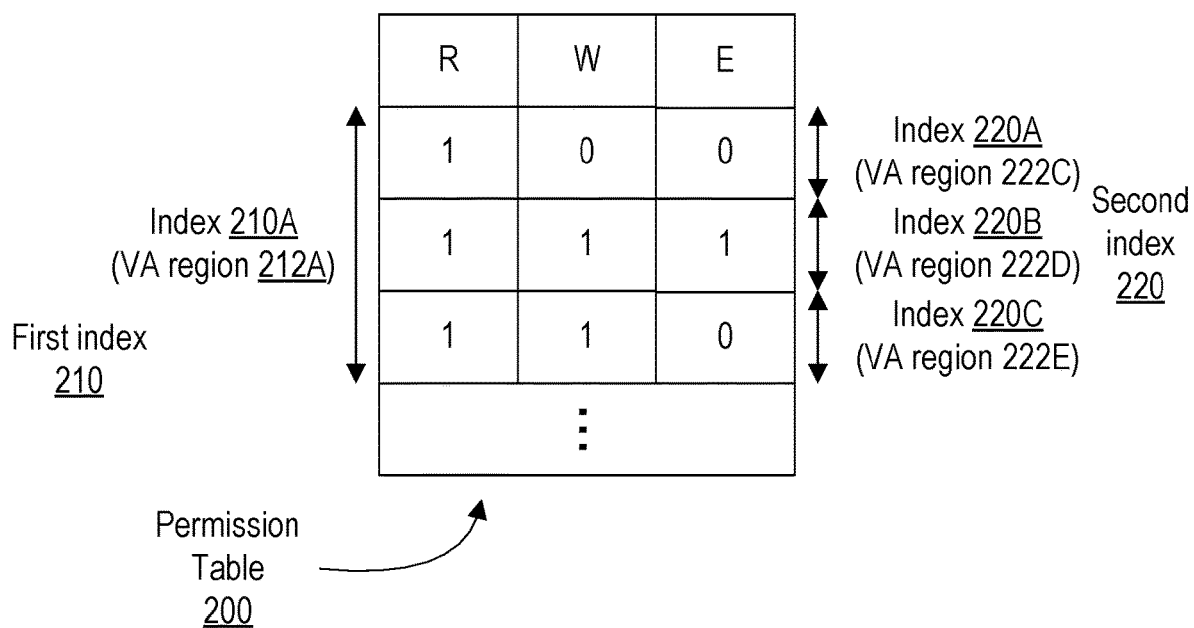

FIG. 2B is an example of a permission table 20 that allows permissions to be specified according to two "dimensions" or properties. As shown, permission table 200 is configured to store read, write, and execute permissions for virtual address regions. In the particular implementation shown in FIG. 2B, a particular set of permissions are accessed using a first index 210 and a second index 220. In other implementations, indexes 210 and 220 could be combined into a single index; two indexes are shown in FIG. 2B in order to demonstrate the more granular nature of the permissions.

The use of two indexes in the depicted embodiment allows permissions to be specified for two different (and independent) virtual address (VA) regions associated with a single instruction. Consider processor 10 executing an instruction having a PC value in VA region 212A and accessing data stored in VA region 222D. Permissions for such an instruction may be accessed by a first index 210 that selects region 212A and a second index 220 that selects a VA region 222D. As shown, region 222 has read, write, and execute permissions. Other regions within the VA space, however, can have different permissions: region 222C has read-only permission, while region 222E has read-write permission. The result of using multiple indexes based on different properties/dimensions is that code in a given region of the VA space (e.g., a thread or a portion of a thread, specified by index 210) can have different memory-access permissions for different memory locations (specified by index 220).

As indicated, indexes 210 and 220 are independent of one another. Consider a VA space. Index 210 may be usable to select any region within this space. Within such a region (e.g., region 222C), index 220 is also usable to again address the entire VA space such that memory permissions for the entire VA space can be defined for a particular piece of code. By making indexes 210 and 220 independent of one another, different permissions for the same memory location can be given to different portions of code. In some implementations, table 200 can be thought of as a two-dimensional table. Note that first index 210 and second index 220 can be a primary index and a secondary index, or vice-versa, in different embodiments.

Figure 3:
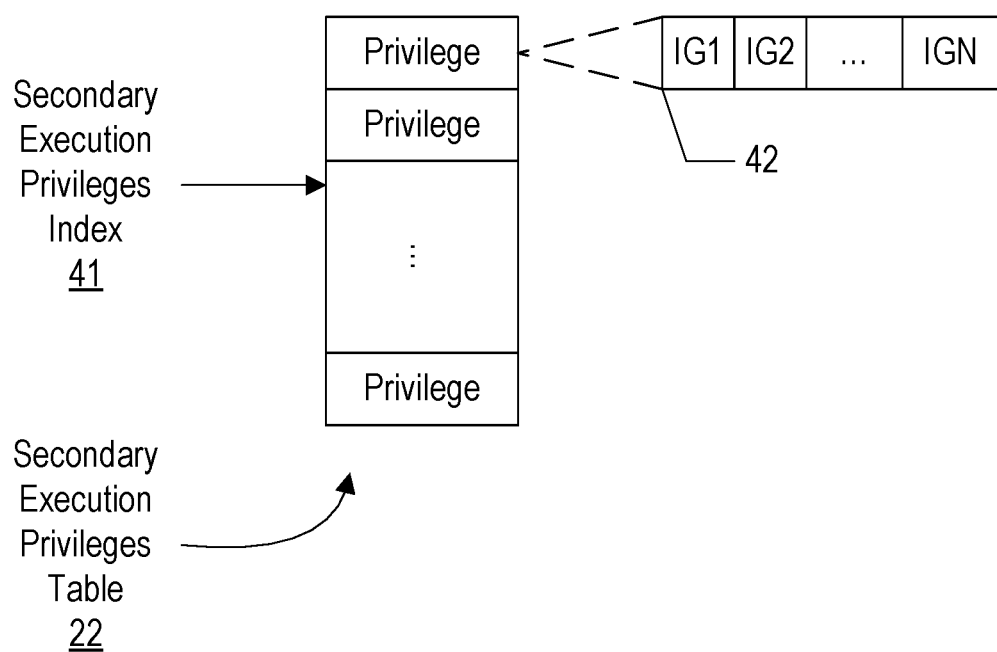
FIG. 3 is a block diagram of a secondary execution privileges table.

FIG. 3 is an example of one embodiment of a secondary execution privileges table 22. Secondary execution privileges table (SEPT) 22 may include a plurality of entries indexed by the secondary execution privileges index (SEPI) 41. An example secondary execution privileges table entry 42 is shown in exploded view. Entry 42 includes an execute permission for each instruction group (e.g., instruction group 1 (IG1), instruction group 2 (IG2) up through instruction group N (IGN). In some instances, various instruction groups (IGs) might have execute permission, while other instruction groups might not have execute permission. In other instances, all IGs may have execute permission.

The use of multiple permission dimensions is now described in more detail with respect to FIGS. 4-5.

Figure 4A:
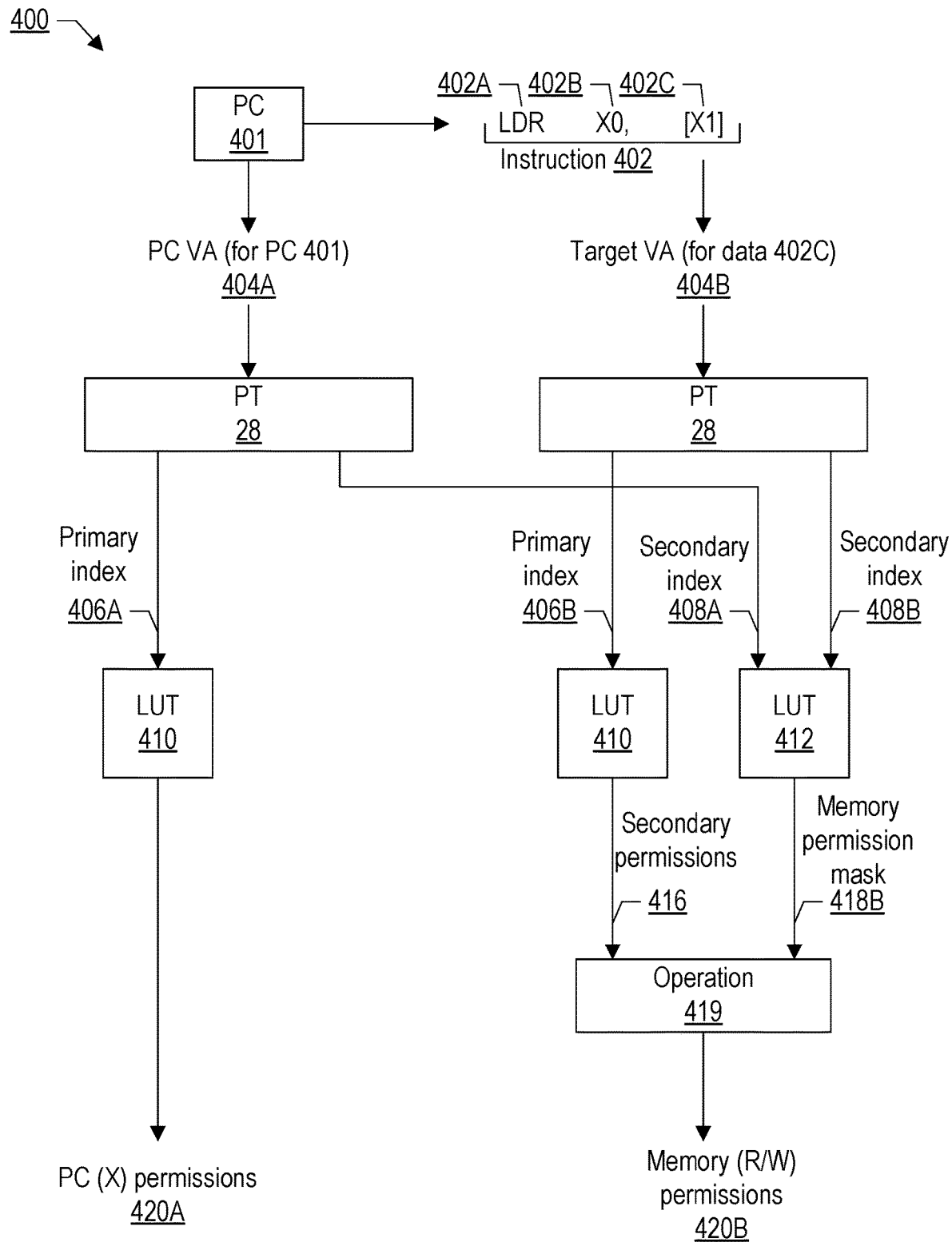
FIG. 4A depicts an example of a permission evaluation for a memory access instruction.

FIG. 4A is a block diagram of one embodiment of a permission evaluation 400 for a memory access instruction 402. As shown, this figure depicts the use of two different virtual addresses (VAs) 404 to find permissions 420 for executing instruction 402 (which has a PC with VA 404A) accessing a target location (which has VA 404B). Such an approach allows, for example, a given memory location to have different access permission for different portions of code.

As shown, PC 401 is the PC value of processor 10 that corresponds to instruction 402. PC 401 specifies a PC virtual address 404A that is used to find execute permissions 420A for instruction 402. In the implementation shown, PC VA 404A may be used to find both permissions 420A and 420B. Memory access instruction 402 is executable by processor 10 to load data from memory. As shown, instruction 402 includes opcode 402A that identifies the particular instruction and operands 402B-C accessed by instruction 402 (note that other instructions may have more or fewer operands). (Generally speaking, operands may include addresses, constants, registers, and the like.) In the depicted example, opcode 402A indicates an ARM LDR instruction, operand 402C indicates that the VA of the location to be accessed by the instruction (i.e., VA 404B) is stored in X1, and operand 402B specifies the destination register that will store the data accessed at target VA 404B.

Page tables 28 is configured to receive virtual address inputs and output respective indexes that can be used to access lookup tables (LUTs). In the depicted embodiment, page tables 28 (which is a single page table despite being depicted as two elements in FIG. 4A) outputs, for each VA input 404, a primary index 406 and a secondary index 408. In response to receiving VA 404A, page tables 28 outputs primary index 406A, which can be used to access LUT 410 to determine execute permissions 420A for instruction 402. Separately, in response to receiving VA 404B, page tables 28 outputs primary index 406B, which can be used to access LUT 410 to determine primary or base memory permissions 416 for target VA 404B. In some embodiments, any of the disclosed LUTs such as LUT 410 may be implemented as one or more registers or as a content addressable memory (CAM).

As noted, it may be desirable to be able to specify more granular memory permissions for target VA 404B based on PC VA 404A. To accomplish this, LUT 412, which stores memory permission masks, may be accessed using two indexes, one of which is selected using VA 404A and the other of which is selected using VA 404B. Different masks can thus be specified for a given program region and a given memory destination. Accordingly, LUT 412 could be implemented as a two-dimensional table in some embodiments. It is understood that primary indexes 406A and 406B could be used to access LUT 412. But the use of distinct secondary indexes 408A and 408B allows LUT 412 to potentially be accessed at a different granularity than LUT 410 (i.e., primary indexes 406 and secondary indexes 408 may have different numbers of bits). In the depicted embodiment, secondary indexes 406A and 406B are used to retrieve memory permission mask 418 from LUT 412.

Primary permissions 416 are the base memory permissions for VA 404B for a given program executing on processor 10. In some implementations, primary permissions 416 may be the maximum possible permissions for any program executing on processor 10. Further permissions restrictions might be effectuated via secondary permissions.

Program developers may desire, for example, to allow a first set of instructions to read/write specific program data, while precluding a second set of instructions from accessing that data. This may be accomplished through the use of secondary indexes 408, which are supplied to LUT 412 to output memory permission mask 418. The use of secondary indexes 408A-B allow the setting of specific permissions for each combination of program location and memory location. For example, developers of a compiler may want a linker routine (at a certain range of PC values) to be able to read and write compiler metadata (at a particular set of memory locations), but also want that same linker routine to only be able to read (and not modify) the code generated by other instructions of the compiler (at a different set of memory locations). This can be accomplished through the use of independent indexes 408 and LUT 412.

Once determined, primary permission 416 and permission mask 418 may be combined (e.g., by a bitwise AND) using operation 419 to output memory access permissions 420B that reflect permissions from both source VA 404A and target VA 404B. By not setting certain bits of permission mask 418, primary permissions 416 may be reduced on an as-needed basis. Thus, processor 10 (e.g., via CTL 24) may use both execute permissions 420A and memory access permissions 420B to determine not only whether instruction 402 is permitted to execute, but also whether instruction 402 is permitted to access the particular target VA 404B specified in the instruction. In some embodiments, execute permissions 420A may be checked during an instruction decode stage of processor 10 that precedes the execution stage, while memory access permissions 420B may be checked before the memory access stage (e.g., during the operand fetch stage or the execution stage). If either permissions 420A or 420B do not indicate authorization, then processor 10 may prevent execution and instead signal an exception.

Note that in other embodiments, entries 34 of PT 28 may include primary indexes as well as immediate secondary permissions (as opposed to storing secondary indexes themselves), resulting in the use of indirection for the primary permission only.

For example, privileged code may assign primary and secondary indexes for each one of OS code, OS data, and kernel data. In such an assignment, an OS code region may be given a primary index 406A that generally evaluates to execution, but a source secondary index 408A that interacts differently with different target secondary indexes 408B. Secondary index 408A for OS code may be combined with a first possible secondary index 408B (e.g. of OS data) to output a mask 418B that allows execution at particular memory location. Alternatively, secondary index 408A for OS code may be combined with a second possible secondary index 408B (e.g., of kernel data) that does not allow execution at the particular memory location.

FIG. 4A illustrates that a single instruction may have multiple relevant permissions—in this case, execute permission and memory access permissions. With respect to the memory access permission, this may be based on two different dimensions or properties, such as the VA of the PC of the instruction itself and the VA of the memory location being accessed. There are similar permission determinations for other types of instructions, such as branch instructions. As will be described with respect to FIG. 4B, permissions may define, for example, whether a branch instruction is permitted to fetch the target instruction. And if the branch target is itself a memory-accessing instruction, permissions may define whether the target instruction is permitted to access the specified memory location.

Figure 4B:
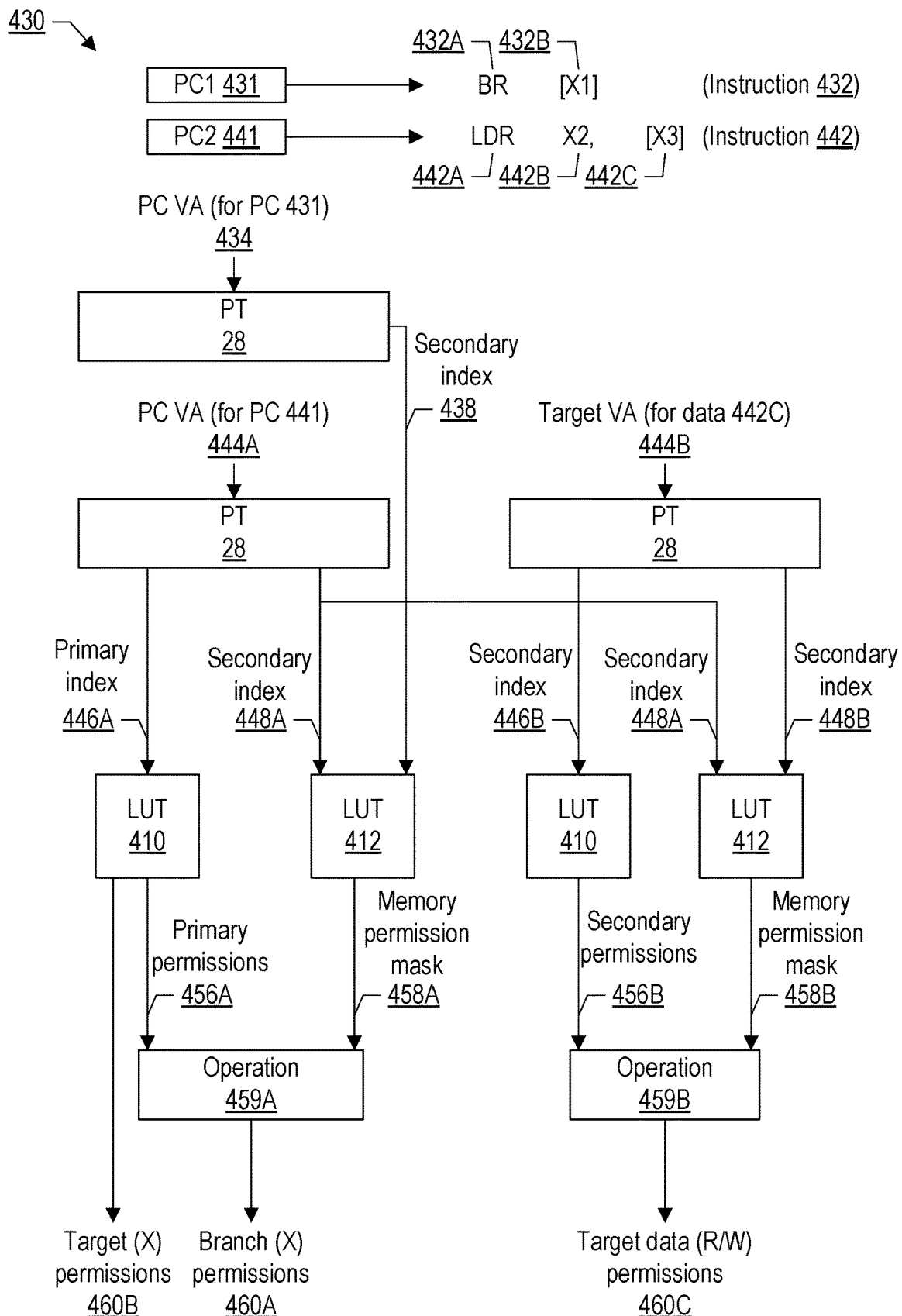
FIG. 4B depicts an example of a permission evaluation for a branch instruction.

FIG. 4B is a block diagram of one embodiment of a series of permission evaluations 430 for a branch instruction 432 whose target (instruction 442) is itself a memory-accessing instruction. As shown, evaluations 430 use various VAs as inputs to LUTs, which are then accessed to determine permissions 460. Branch permissions 460A determine whether instruction 432 is permitted to branch to target instruction 442 in the first instance. Additionally, target execution permissions 460B specifies whether target instruction 442 is permitted to execute. Finally, target data permission 460C specifies whether target instruction 442 is permitted to access the specified memory location. Note that execute permissions for instruction 432 may have already been determined; this process is thus not depicted in FIG. 4B.

As shown, branch instruction 432 is executed at PC2 431, which corresponds to VA 434. Instruction 432 has an opcode 432A indicating an ARM BR instruction and includes operand 432B that points to a register X1 that stores the target address of the branch (i.e., target instruction 442) Target instruction 442 is executed at PC2 441, which corresponds to VA 444A. Instruction 442 has an opcode 442A indicating an ARM LDR memory instruction, and includes operands 442B-C. Operand 442B specifies register X2 as the destination of the load operation, while operand 442C specifies register X3 that stores the target memory location (having VA 444B).

Branch permissions 460A are determined using information from both instructions 432 and 442. Primary memory permissions 456A are determined from LUT 410 based on a primary index 446A obtained from page tables 28 using VA 444A (the PC of instruction 442). (This operation is analogous to obtaining primary memory permissions 416, described above with respect to FIG. 4A.) Meanwhile, memory permission mask 458A is determined from LUT 412 using secondary indexes 438 and 448A. Secondary index 438 is obtained from PT 28 using VA 434 (a primary index—not pictured—may also be obtained from the same entry in PT 28 in order to determine execute permissions for instruction 432). Similarly, secondary index 448A is obtained from PT 28 using VA 444A. Primary permission 456A and mask 458A are then combined (e.g., bitwise ANDed) in operation 459A to output branch permissions 460A. Accordingly, information from both branch instruction 432 and target instruction 442 and can be used to verify that the branch is permitted.

Note that execute permissions 460B for instruction 442 can also be determined from LUT 410 using primary index 446A, in a manner analogous to the determination of execute permissions 420A described with respect to FIG. 4A.

Memory access permissions 460C for instruction 442 are determined in a manner analogous to that described with respect to permissions 420B in FIG. 4A. Specifically, permissions 460C are determined using information derived from both VA 444A (the PC of instruction 442) and VA 444B (the memory location addressed by instruction 442). Primary memory permissions 456B are determined from LUT 410 based on a primary index 446B obtained from page tables 28 using VA 444B (the PC of the target of instruction 442). Meanwhile, memory permission mask 458B is determined from LUT 412 using secondary indexes 448A-B. Note that secondary index 448A has already been retrieved from PT 28 in the context of determining memory permissions 460A. Secondary index 448B is obtained from PT 28 using VA 444B. Primary permission 456B and mask 458B are then combined (e.g., bitwise ANDed) in operation 459B to output memory access permissions 460C.

Once permissions 460 are obtained, they can be evaluated at different stages of an execution pipeline of processor 10. In some embodiments, processor 10 may evaluate permissions 460A before the fetch stage of branch instruction 432 to ensure the fetching of target instruction 442 is permitted. If fetching of branch is allowed, then processor 10 may evaluate permissions 460B before the execute stage of memory instruction 442 to ensure that this instruction is permitted to execute. Similarly, processor 10 may evaluate permission 460C at or before the memory stage of instruction 442 in order to determine whether access to memory at VA 444B is permitted. Alternatively, permissions 460A-C may all be evaluated before executing instruction 432. If any of permissions 460A-C are not permitted, processor 10 may prevent execution of both instructions 432 and 442 and instead signal an exception.

Note that for both FIGS. 4A and 4B, multiple table accesses are used to retrieve appropriate execute and memory access permissions. Alternatively, input VAs and output permissions may be cached for easier access in a TLB (e.g., TLB 26). In other embodiments, indexes related to the instruction (e.g., indexes 406A and 408A) may be stored directly as fields of the PC as opposed to being retrieved from a PT.

Figure 4C:
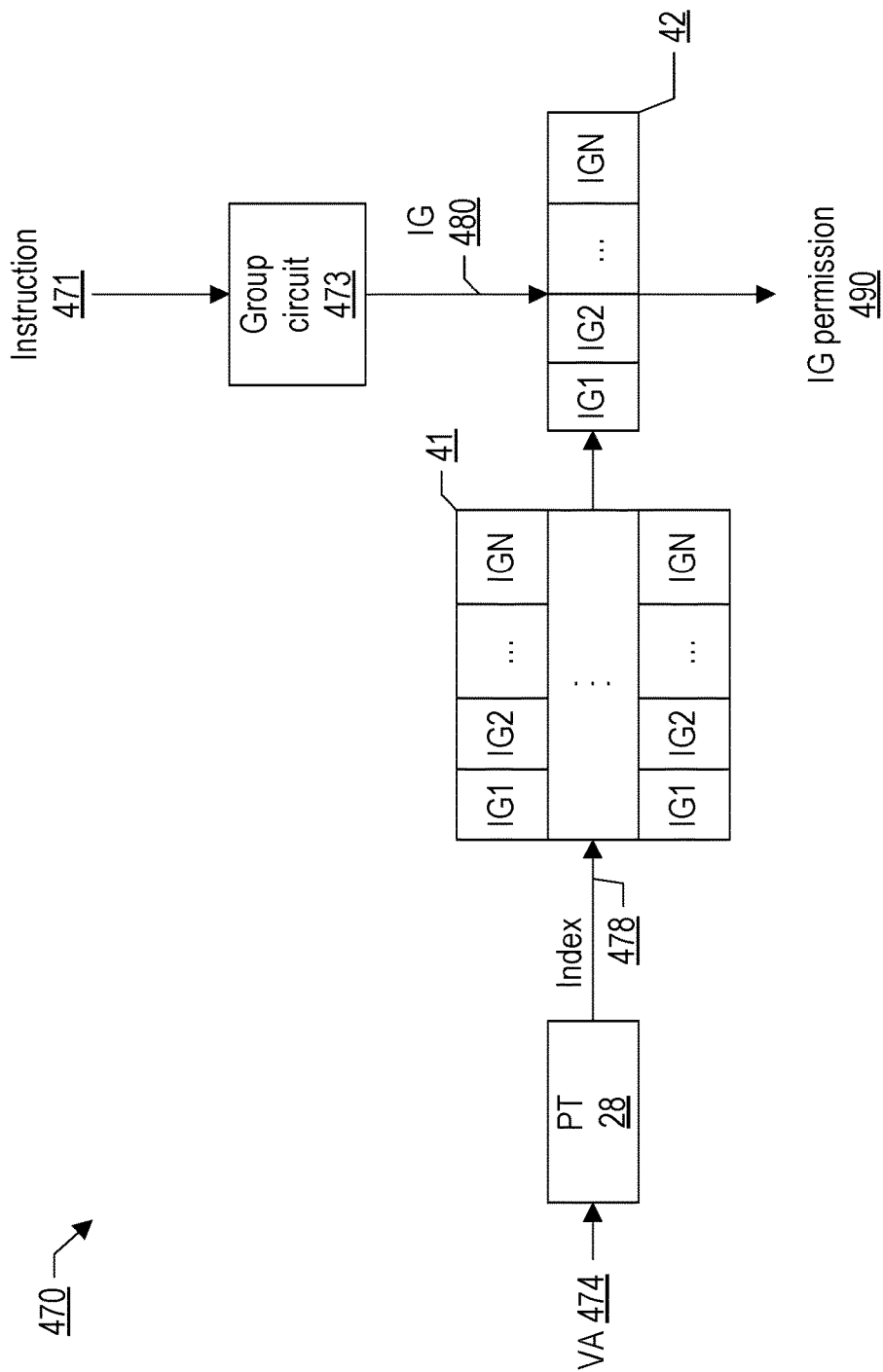
FIG. 4C depicts an example of a permission evaluation for an instruction-group-based permission.

FIG. 4C is a block diagram depicting one embodiment of a instruction group evaluation 470. As shown, instruction 471 and the VA 474 (which may be obtained from the instruction's PC) are inputs to a group circuit 473 and PT 28 to generate instruction group (IG) permission 490. Note that evaluation 470 may be implemented independently of evaluations 400 and 430 in some embodiments. But in other embodiments, evaluation 470 may be used in combination with other disclosed evaluations.

The instruction's VA 474 is provided to PT 28 to obtain an index 478, which is in turn used to select a corresponding entry 42 from table 41. Entry 42 stores permissions indicating which IGs an instruction at that VA is permitted to execute. Index 478 is similar to the indexes described in FIGS. 4A-B.

Index 478 may be obtained differently than shown. In some embodiments, the PC of instruction 471 may directly store index 478, which would allow for its direct use without needing to access PT 28. As an alternative, table 41 may be indexed similarly to other disclosed LUTs.

Group circuit 473 is configured to determine the corresponding IG 480 of instruction 471. The assignment of ISA instructions into IGs may, in some embodiments be predetermined and non-modifiable (e.g., hardwired in group circuit 473). In other embodiments, the assignments in group circuit 473 are modifiable (e.g., by the operating system or other privileged program).

In one embodiment, IG 480 is output by group circuit 473 as a bit vector in which the field corresponding to the determined IG of instruction 471 is set and the remaining fields are not set. In this manner, IG 480 can be ANDed with table entry 42. If both corresponding values in table entry 42 and IG 480 (that is, the IG group corresponding to the IG of instruction 471) are set, execution of instruction 471 is permitted, as indicated by IG permission 490.

In some embodiments, circuit 473 is implemented as a LUT with opcode inputs (e.g., in instruction 471) and corresponding IG 480 outputs (i.e., each instruction is assigned an IG). As noted, circuit 473's instruction-to-instruction-group mappings may be modified depending on the software's intended use (e.g., an OS may want to group instructions by ISA version for compatibility, etc.). In some cases, instruction groups may change in granularity and there may thus be numbers of groups ranging from 2 (e.g., memory instructions and non-memory instruction) to the number of instructions in the ISA (e.g., every instruction in the ISA is its own group).

IG permission 490 can thus be generated from an instruction 471 and its VA 474. In some embodiments, permission 490 is enforced at the decode stage prior to execution. Alternatively, a permission 490 that indicates a no-execute condition may set a flag that causes an exception that can be signaled at a subsequent stage.

Evaluation 470 can thus be used to determine whether instructions to be executed are part of a permissible IG. For example, some subset of instructions in the ISA may affect sensitive registers and should only be permitted to execute from certain regions of code (such as the operating system kernel). Such instructions can be defined as belonging to the same IG, and that group can have its permissions disabled for all VA regions except for the privileged code region. Among other things, this approach allows sensitive instructions to be limited to executing as part of the kernel and be prevented from executing in other code (e.g., user mode).

The techniques disclosed in FIGS. 4A-C may be used individually or in combination with one another. For example, IG permissions may be used alongside PC-based memory, branch, and execution permissions as desired. Such an implementation may be used to prevent the execution of instructions that would be permitted by other disclosed techniques. In other words, instructions of a certain IG may be prevented from execution even if they exist in VA regions that pass other permission checks.

Execution Modes

The techniques described above with respect to FIGS. 4A-C provide flexibility for setting permissions on a granular basis. As described, different portions of code may be given different permissions with respect to the same memory location, and a single code portion can be given different permissions with respect to different memory locations. Still further, different code portions can be prevented from executing different subsets of instructions through the use of IG-based permissions. This approach affords a great degree of flexibility and avoids the need for overhead-intensive context switches to enforce different permissions.

An additional degree of flexibility can be introduced through the use of different execution modes. Each mode can have its own set of permissions relative to other modes. This approach allows, for example, code to have different memory permissions relative to the same set of memory locations when executing in different modes. Similarly, certain instruction groups in a portion of code can have different execute permissions in different modes. Such modes can be set in some implementations by setting bits in a special purpose register in a privileged mode. In other cases, modes can be changed using a dedicated special-purpose mode change instruction. As will be described below, modes may be implemented in some embodiments through the use of different lookup tables, one corresponding to each possible mode and each implemented permission. For example, if execution, memory, and IG permissions are all implemented and there are three possible modes, in one implementation, nine lookup tables might be used.

The use of different modes for memory access permissions is illustrated in FIG. This figure depicts a block diagram of one embodiment of a permission evaluation 500 for a memory access instruction 502 having PC 501 (at VA 504A) executing in one particular mode 503 out of multiple possible modes. Instruction 502 includes opcode 502A and operands 502B-C. Permission evaluation 500 is similar to permission evaluation 400 depicted in FIG. 4A, but with multiple possible LUTs for memory permissions 520B.

Execute permissions 520A for instruction 502 are determined in the same manner as described with respect to FIG. 4A. As with memory permissions 420B, memory permissions 520B are determined using information from both the PC of target instruction 502 (VA 504A) and the target memory location (VA 504B). First, source VA 504A is used to access PT 28 to obtain primary index 506A and secondary index 508A. Then, target VA 504B is used to access PT 28 and to obtain primary index 506B and secondary index 508B. Primary index 506B is used to access LUT 510, which results in primary memory permissions 516. But with respect to the secondary memory permissions, mode value 503 is used to select one of LUTs 512, each of which can have different permissions values. Once a particular LUT 512 is selected, secondary indexes 508A and 508B are used to obtain mask 518. Primary permission 516 and mask 518 may then be combined (e.g., ANDed) in operation 519 to output memory access permissions 520B. Memory access permissions 520B may thus be selected according to three dimensions or properties—code location, memory location, and mode.

Note that mode 503 may also be used to modify other types of permissions that have been described. For example, an alternative embodiment of FIG. 4B may support modes for branch instructions by replacing LUT 412 with multiple LUTs and using mode 503 to select the appropriate one. Similarly, an alternative embodiment of FIG. 4C may include multiple LUTs that define different IG permissions, where an appropriate LUT is selected based on mode 503.

Figure 5A:
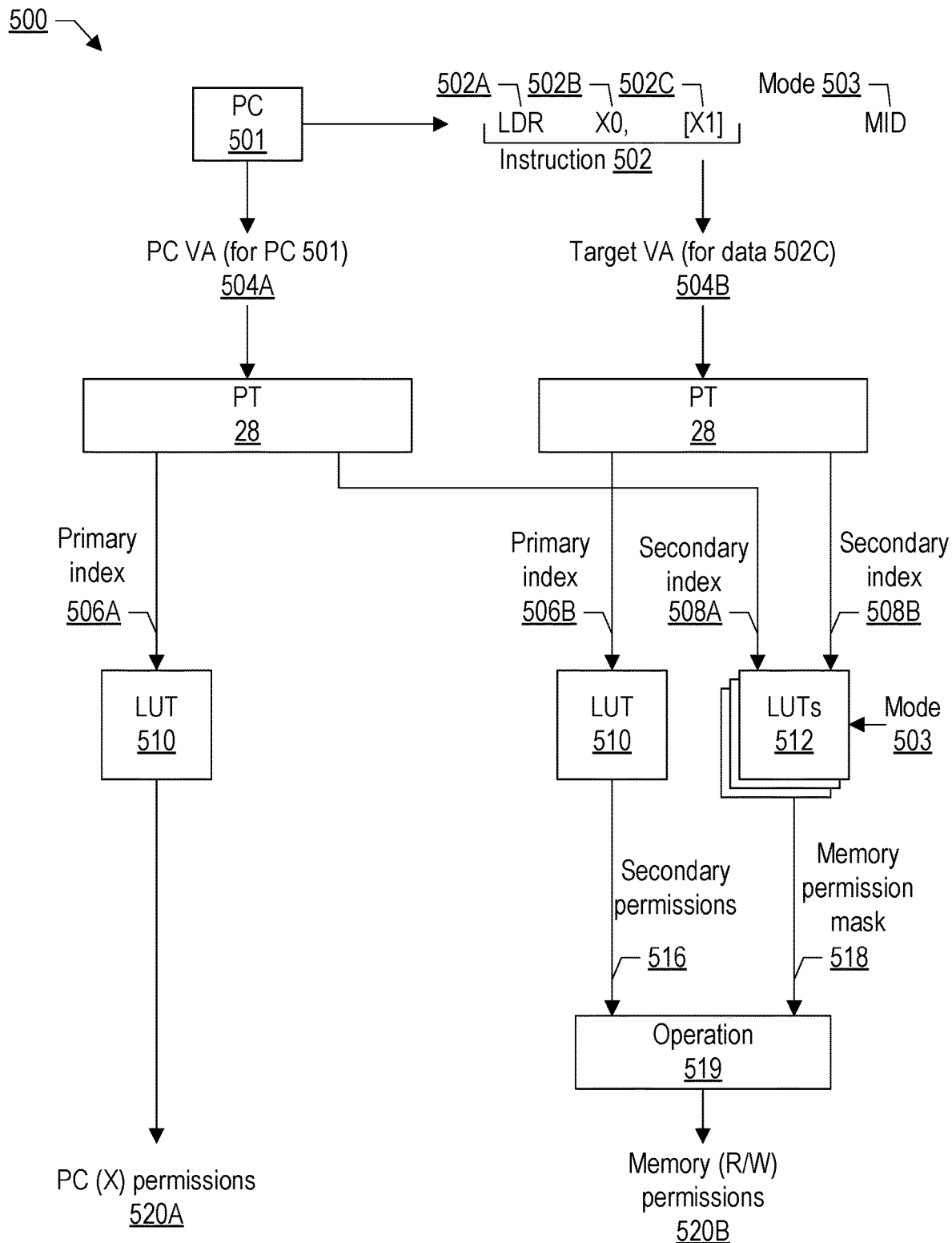
FIG. 5A depicts an example of a mode-based permission evaluation for a memory access instruction.
Figure 5B:
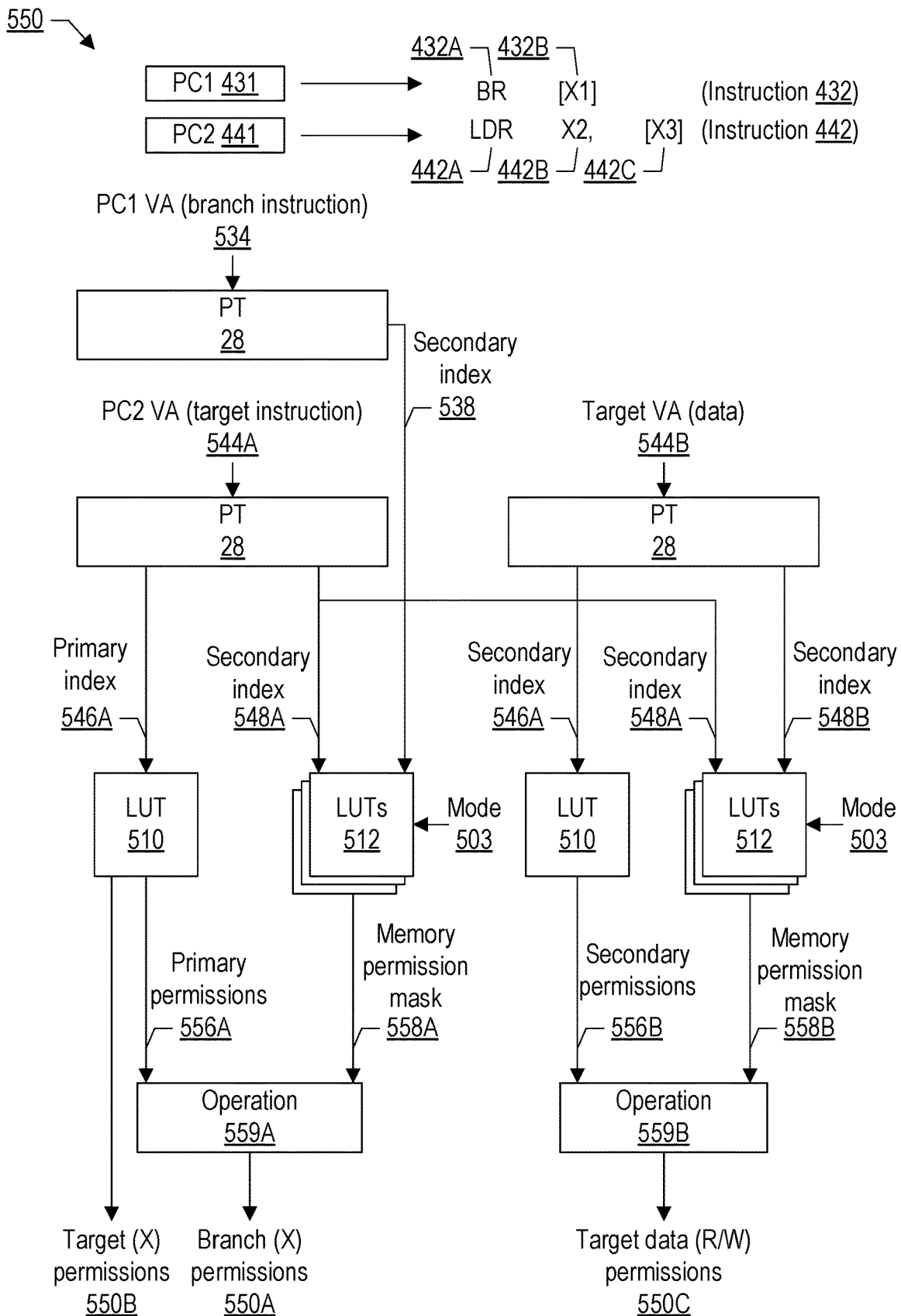
FIG. 5B depicts an example of a mode-based permission evaluation for a branch instruction.

FIG. 5B is a block diagram of one embodiment of a permission evaluation 550 for instructions executing in mode 503. The general flow depicted in FIG. 5B is identical to that depicted in FIG. 4B, but with the use of multiple LUTs to implement different permissions for different modes. As shown, mode-specified LUTs are selected for both instructions 432 (having PC2 431, opcode 432A and operand 432B with target VA 544A) and 442 (having PC2 441 with VA 544A, opcode 442A and operands 442B and 442C, the latter having a target VA 544B).

The main difference between evaluation 550 of FIG. 5B and evaluation 430 of FIG. 4B, which depicts a permission evaluation for a branch instruction without considering modes, is the replacement of LUTs 412 with LUTs 512 and the use of mode 503.

Branch permission 550A is determined using information from both instructions 432 and 442. Primary memory permissions 556A are determined from LUT 510 based on a primary index 546A obtained from page tables 28 using VA 544A (the PC of instruction 442). Meanwhile, memory permission mask 558A is determined from a LUT 512 (selected by mode 503) using secondary indexes 548A and 538. Secondary index 548A is obtained from PT 28 using VA 544A. Similarly, secondary index 538 is obtained from PT 28 using VA 534A (corresponding to the PC of instruction 432). Primary permission 556A and mask 558A are then combined in operation 559A to output branch permissions 550A. Accordingly, information from both branch instruction 432 and target instruction 442 are used to verify that the branch is permitted.

Note that execute permissions 550B for instruction 442 can also be determined from LUT 510 using primary index 546A, in a manner analogous to the determination of execute permissions 420A described above with respect to FIG. 4A.

Memory access permissions 550C for instruction 442 are determined in a manner analogous to that described with respect to permissions 420B in FIG. 4A. Specifically, permissions 550C are determined using information derived from both VA 544A (the PC of instruction 442) and VA 544B (the memory location addressed by instruction 442). Primary memory permissions 556B are determined from LUT 510 based on a primary index 546B obtained from page tables 28 using VA 544B (the PC of the target of instruction 442). Meanwhile, memory permission mask 558B is determined, from an LUT 512 selected by mode 503, using secondary indexes 548A-B. Note that secondary index 548A may already have been retrieved from PT 28 in the context of determining memory permissions 550A. Secondary index 548B is obtained from PT 28 using VA 544B. Primary permission 556B and mask 558B are then combined in operation 559B to output memory access permissions 550C.

Example Hardware Implementation

Various types of permissions have been described with respect to FIGS. 4-5. While these permissions have in some cases been shown in isolation, they may also be combined in various embodiments. One possible hardware implementation that combines the features of FIGS. 4-5 is now described with respect to FIGS. 6A-C.

Figure 6A:
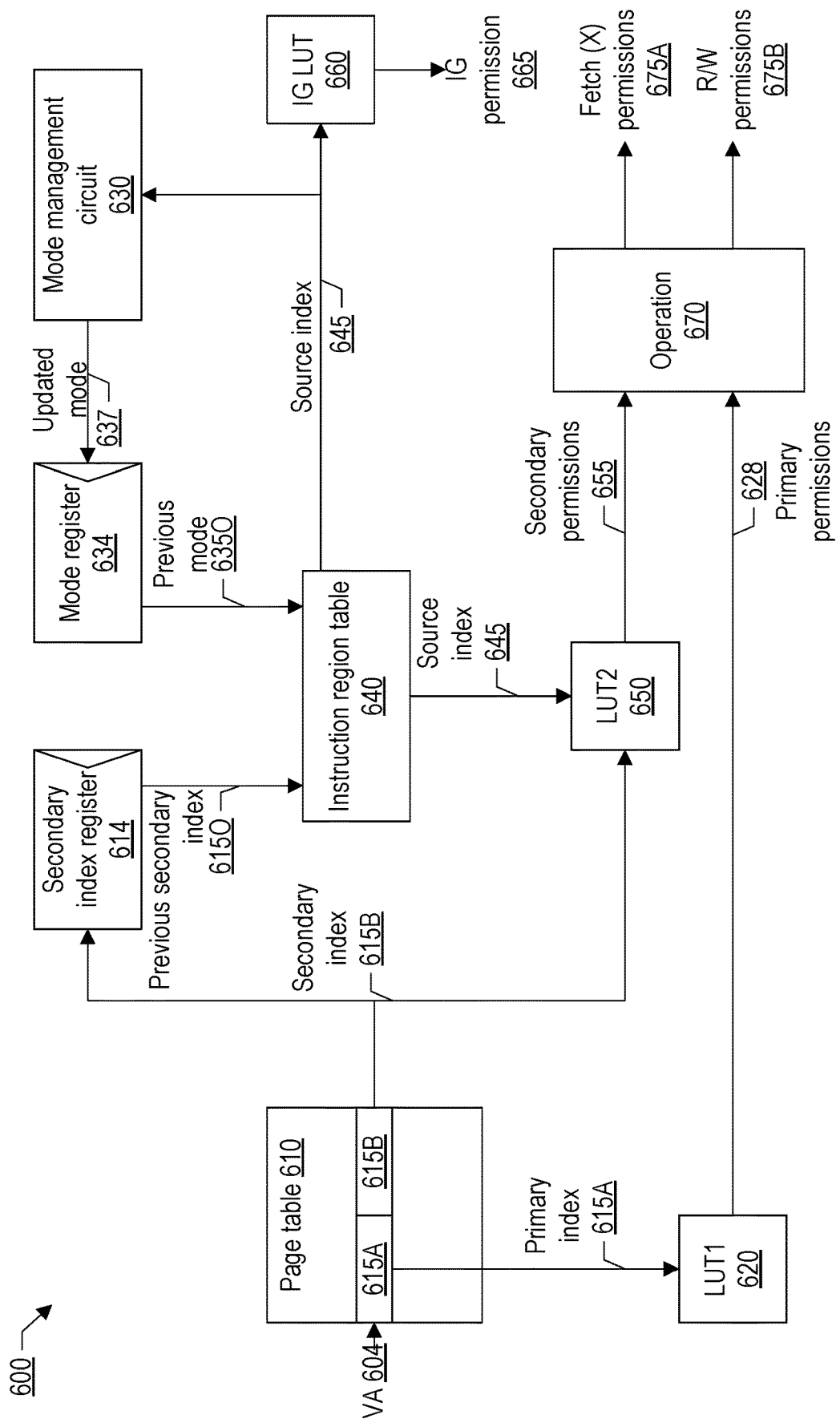
FIG. 6A is a block diagram of one embodiment of a circuit configured to perform PC-based permission evaluations for instructions.

FIG. 6A is a block diagram of a permission evaluation circuit 600. Circuit 600 evaluates permissions for various types of instruction (e.g., branch, memory access, mode change) using virtual addresses and lookup tables that retrieve IG permissions 665 and 628 according to various combinations of mode, instruction group, and VA region. As shown, circuit 600 includes a page table 610, LUTs 620 and 650 and 660, mode management circuit 630, instruction region table circuit 640, and operation circuit 670. In some embodiments, circuit 600 is implemented within control circuit 24.

Page table 610 is configured to store primary and secondary indexes for each VA region. As shown, VA 604 of an instruction is used to access table 610 and output primary index 615A and secondary index 615B, both of which are used in evaluating permissions. Primary index 615A is used to obtain primary permissions 628, while secondary index 615B is used along with other data to obtain secondary permissions 655.

Circuit 600 can be used to compute permissions for different types of virtual addresses. Thus, in one use of circuit 600, VA 604 may be the PC of an instruction to be executed. In another use of circuit 600, VA 604 may the memory address of a memory location being addressed by a memory-accessing instruction.

LUT1 620 is configured to store primary permissions indexed by primary indexes. As shown, LUT1 620 is accessed using primary index 615A, which results in primary permissions 628. LUT1 may be implemented using a content addressable memory in some embodiments. In some embodiments, LUT1 620 may be implemented as a circuit that uses indirection to retrieve permissions using index 615A, as will be described in more detail with respect to FIG. 6B.

FIGS. 5A-B described the use of LUTs 512 to store permission information for different execution modes. LUTs 512 were described as being accessed using three inputs: mode 503, secondary index 508A (obtained using instruction PC), and secondary index 508B (obtained using target address). In the context of FIG. 6A, the functionality of LUTs 512 is implemented by the combination of instruction region tables 640 and LUT2 650. As can be seen, instruction region table 640 receives previous secondary index 615O and previous mode 635O, while LUT2 650 receives secondary index 615B. As will described below, secondary index 615O can be considered to be equivalent to secondary index 508A, while secondary index 615B can be considered to be equivalent to secondary index 508B.

During a given instruction cycle, two versions of secondary index 615B are available for use within circuit 600. A current version of index 615B is available as input to LUT2 650. Additionally, a previous version of secondary index 615O is available as an input to instruction region tables 640. In this way, information from the previous instruction or stage is captured via previous secondary index 615O and may be used when evaluating permissions to compare against data from a previous instruction or pipeline stage. In the example of FIG. 4B, index 615O might correspond to secondary index 438 (which is obtained from VA 434 of instruction 432), while 615B might correspond to secondary index 448A (which is obtained from target PC VA 444A of instruction 441).

Secondary indexes 615B and 615O may be continuously updated. In the context of FIG. 5 for example, at the fetch stage of a branch target instruction 442, secondary index 615B corresponds to the index obtained from instruction 442's VA 544A. Previous index 615O, on the other hand, corresponds to the index obtained from the branch instruction 432, which is located at VA 534. Then, at the decode/execute stage of the instruction 442, secondary index 615B will change to an index obtained using target address having VA 544B, while previous index 615O will change to the index previously in 615B (i.e., the index obtained from instruction 442's VA 544A), by virtue of being stored in register 614. Thus, circuit 600 is able to use information pertaining to previous processor state to evaluate permissions for both memory and branch instructions.

Instruction region table circuit 640, in one embodiment, is a table that can receive information from secondary index 615O and previous mode 635O, and output a source index 645 that may be smaller in size that the concatenated length of 615O and 635O. In one implementation, 615O and 635O might be 7 bits each, and source index 645 7 bits, representing a compressed version of the combination of 615O and 635O. Source index 645 is thus able to capture information with respect to a previous pipeline stage, as opposed to secondary index 615B, which relates to a current pipeline stage. The combination of source index 645 and secondary index 615B can be concatenated to act as index into LUT2 650. Note that source index 645 is also provided as an input to mode management circuit 630, and IG LUT 660.

LUT2 650 is configured to store and output secondary permissions 655 indexed by secondary index 615B (obtained from PT 610) and source index 645 (obtained from instruction region table circuit 640). Source index 645 corresponds to data from the previous instruction, while secondary index 615B corresponds to the current instruction. In one sense, secondary permissions 655 can be said to describe whether it is permitted to "go from" the previous instruction to the current instruction.

Primary permissions 628 and secondary permissions 655 are combined at circuit 670 to output permissions 675. Permissions 675 may correspond to fetch permissions 675A when determined at the fetch stage. These permissions are typically related to the instruction (e.g., branches). Read/write permissions 675B, on the other hand, are typically related to memory. In some embodiments, circuit 670 may output individual permission bits that depends on the instruction stage. But in other embodiments, circuit 670 is configured to update a four-bit permission register once at the beginning of the instruction cycle that is then accessed by processor at the appropriate stage.

Because a change in mode may dramatically affect permissions (allowing instructions to access data to which they are not authorized), steps may be taken to prevent unauthorized mode changes. Mode management circuit 630 is thus configured to output updated mode 637 at a current cycle and ensure that no unauthorized mode change instruction is executed. Most instructions do not change updated mode 637, and updated mode 637 and previous mode 635O thus typically have the same value. But for a mode-changing instruction, circuit 630 uses index 645 corresponding to that instruction to determine whether an the value of updated mode 637 will be changed. One embodiment of circuit 630 will be described in more detail with respect to FIG. 6C. Note that other elements of circuit 600 only "see" previous mode 635O, which prevents permissions from being evaluated according to an unauthorized new mode. Once a new mode is approved, then it will become previous mode 635O in the next cycle and would thus be visible to the rest of circuit 600.

IG LUT 660 is configured to store IG permissions 665, which act as an additional "overlay" to execution permissions 675A. Some or all of index 645 may identify the instruction's instruction group. Notably, entities may modify the values of LUT 660 to enforce policies on permissions of a certain group (as opposed to modifying instructions according to their VAs). LUT 660 may in some embodiments be additionally indexed by mode for further granularity. For example, a processor may disable some high power-consumption instructions in a given execution mode to increase battery life. In other embodiments, IG LUT 660 is not used, and processor 10 only uses permissions 675.

Circuit 600 thus uses multiple criteria to determine whether a program is permitted to execute. Notably, the present embodiment circuit 600 supports branch, memory access, and mode change instructions due to the use of registers that preserve previous stage information via Instruction region tables 640, and mode management circuit 630 which determines whether a mode can be changed or not. Circuit 600 may be implemented as a single circuit of processor 10 or its functionality may be split across multiple circuits. For example, LUTs may be stored in memory, while other circuitry may be part of processor 10.

Figure 6B:
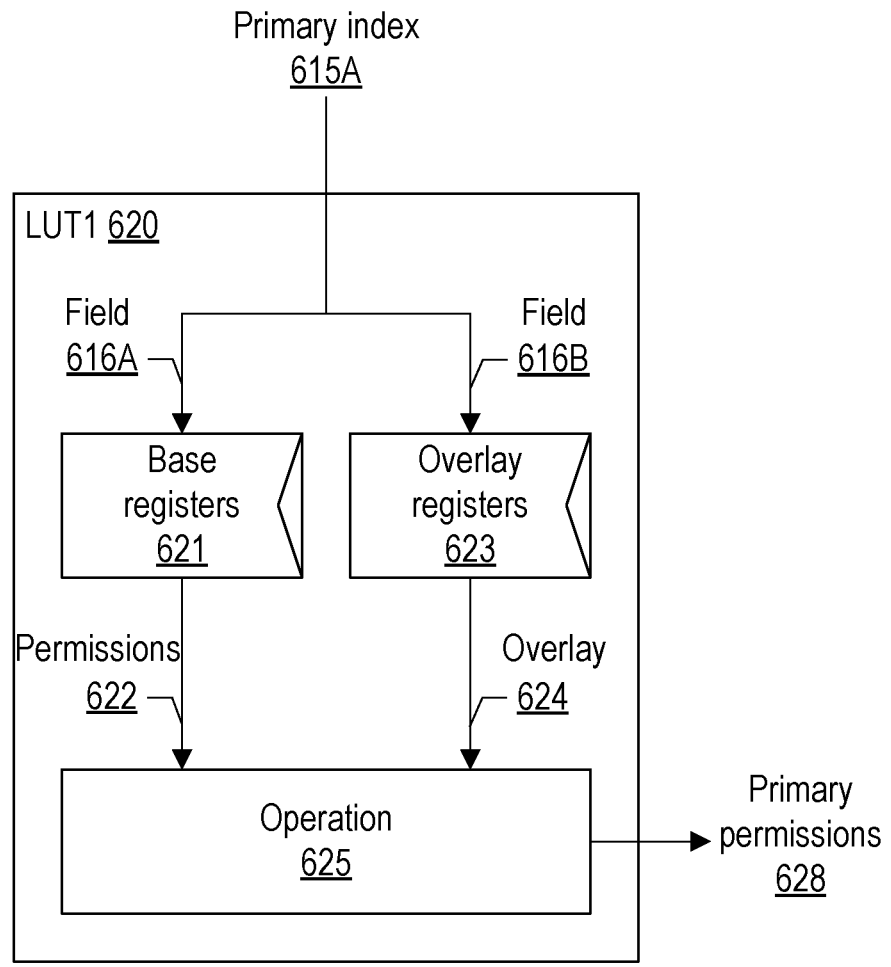
FIG. 6B is a block diagram of one embodiment of a primary permission lookup table within the circuit depicted in FIG. 6A.

FIG. 6B is a block diagram of one embodiment of LUT1 620, which is configured to evaluate primary permissions 628 according to primary index 615A. As shown, LUT1 620 includes base registers 621, overlay registers 623, and an operation circuit 625. As further shown, the lookup of LUT1 620 is split into two parallel lookups instead of the single lookup depicted with respect to FIG. 6A.

In the illustrated embodiment, LUT1 620 is configured to split primary index 615A into fields 616A-B. Field 616A is used to retrieve base permissions 622 from base registers 621, and field 616B is used to retrieve overlay permissions 624 from overlay registers 623. Finally, base and overlay permissions 622 and 624 are combined (e.g., ANDed) at operation circuit 625 to output primary permissions 628.

Notably, each field 616A and 616B includes different bits of primary index 615A. This approach may allow for more granularity in permissions 628 relative to a single index 615A, as registers 621 and 623 can be changed separately. For example, base registers 621, which may correspond to different PC regions, may be set independently of the different overlay registers 623, which may correspond to different memory locations being accessed. As another advantage, registers 621 and 623 may have lower read/write latency compared to data stored in memory 30, allowing permission modifications to be completed more quickly.

Alternative embodiments of LUT1 620 are also contemplated, including those that may use additional input types and/or indexes. For example, LUT1 620 may be further configured to use mode information and thus include additional base registers 621 and/or overlay registers 623 that are selected depending on the appropriate mode. As another example, overlay registers 623 may be indexed by an instruction group that replaces field 616B, causing permissions 628 to also account for the instruction's instruction group.

Figure 6C:
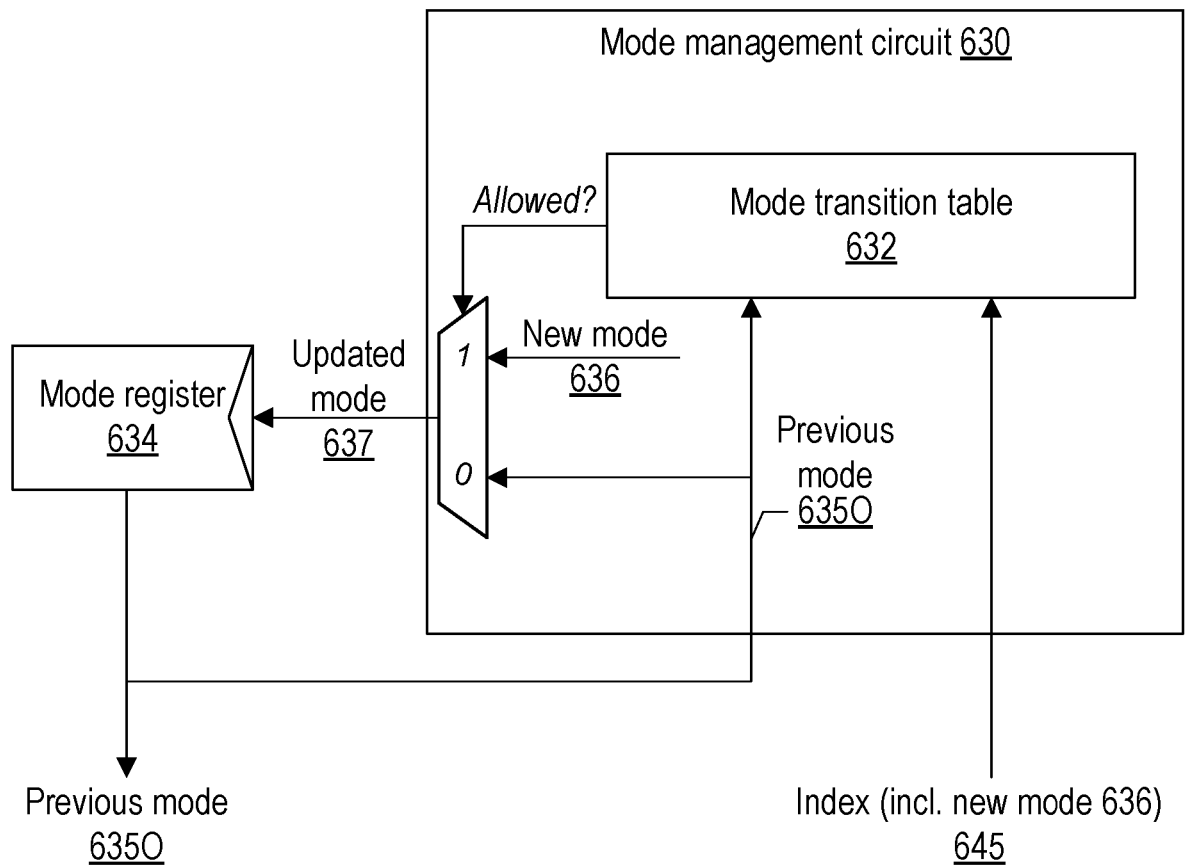
FIG. 6C is a block diagram of one embodiment of a circuit configured to manage execution modes within the circuit depicted in FIG. 6A.

FIG. 6C is an example embodiment of a mode management circuit 630 configured to evaluate an updated mode 637. When the current instruction is not a mode change instruction, the values of updated mode 637 (and thus previous mode 635O) do not change. But when the current instruction is a mode change instruction that sets a new mode 636, circuit 630 is configured to determine whether the mode change is permitted. This check is performed using mode transition table 632 before updating the value of mode 637.

Mode transition table 632 is configured to store mode transition permissions indexed by previous mode 635O and source index 645. For example, table 632 may be configured to permit transitioning from a mode associated with kernel code to a mode associated with OS code, and not permit a transition in the reverse direction. Note that the association between modes and code may be determined by the processor 10 and accordingly updated according to program and processor requirements. For example, more complex processors may use more modes (and thus result in a larger table 632) than a less complex processor. In some embodiments, new mode 636 may be obtained using select bits of source index 645 and used alongside previous mode 635O to determine whether the change from mode 635O to new mode 636 is permitted. If a mode change is permitted, then the multiplexer selects new mode 636 to update mode register 634 to updated mode 637. In the illustrated embodiment, the value of mode 635O will change a subsequent clock cycle after the value of mode 637 is updated (due to register 634). On the other hand, if the change is not permitted according to table 632, then an exception may be signaled, the mode change instruction may be aborted, and/or updated mode 637 may retain the value of previous mode 635O. As with other tables, table 632 may be indexed using different types of indexes. For example, table 632 may be indexed by two secondary indexes, similar to LUTs 412.

Figure 7A:
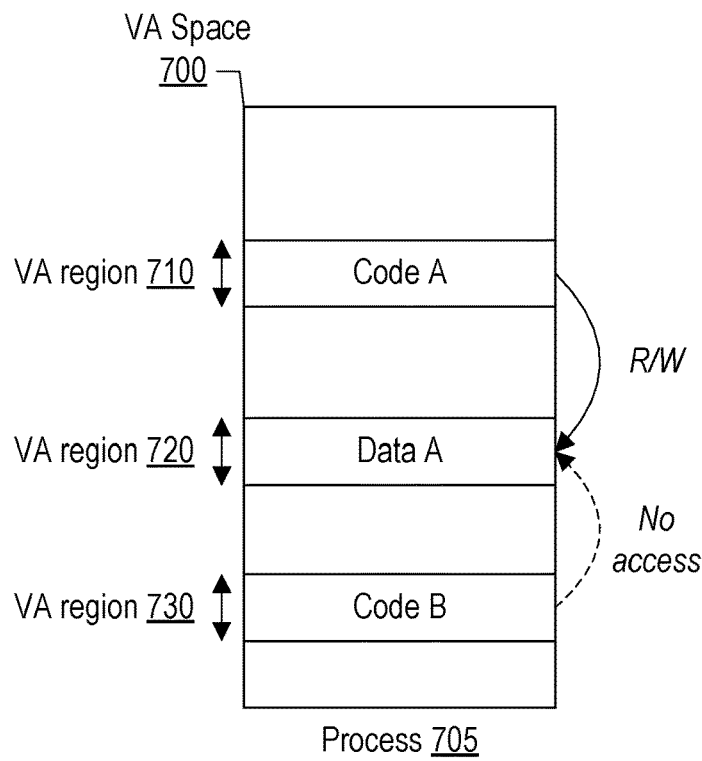
FIG. 7A is a block diagram illustrating one example of PC-based virtual address permissions within a virtual address space.

FIG. 7A is an example of memory permissions within a VA space 700 of the same process 705. As shown, VA space 700 includes code A at VA region 710, data A at VA region 720, and code B at VA region 730. Arrows from one VA region to another indicate the desired permissions to be enforced. The arrow from code A to data A indicates that code A has read/write access to data, while the dashed arrow from code B to data A indicates that code B should not be able to access to data A. Table 1 shown below summarizes the desired permissions.

TABLE 1

| Source | Destination | Operation | Allowed? |
|---|---|---|---|
| Code A | Data A | Read | Y |
| Code B | Data A | Read | N |

These permissions may be stored in a permissions table and retrieved using source and destination VAs, according to some embodiments. In this specific example, processor 10 may use VA regions 710 and 720 to obtain (via e.g., page table 20) indexes used in a permissions table (e.g., LUT 412) and then determine that code A is permitted to read data A. Similarly, processor 10 may use VA regions 720 and 730 in a similar fashion to determine that code B is not permitted to read data A.

These permissions may be used for "sandboxing" different portions of one process to isolate them from each other as needed. For example, the disclosed techniques may be used to enable a "malloc" routine of a process (e.g., code A) to maintain and have access malloc metadata (e.g., data structures such as found in data A) while preventing other routines of that process (e.g., code B) from accessing that metadata. As another example, a kernel may maintain metadata and simultaneously allow kernel code access to that metadata while denying that access to untrusted third-party driver code. Implementing these "policies" may be accomplished by modifying permission table permissions such that the table will include the appropriate permissions at the corresponding sets of virtual addresses.

Figure 7B:
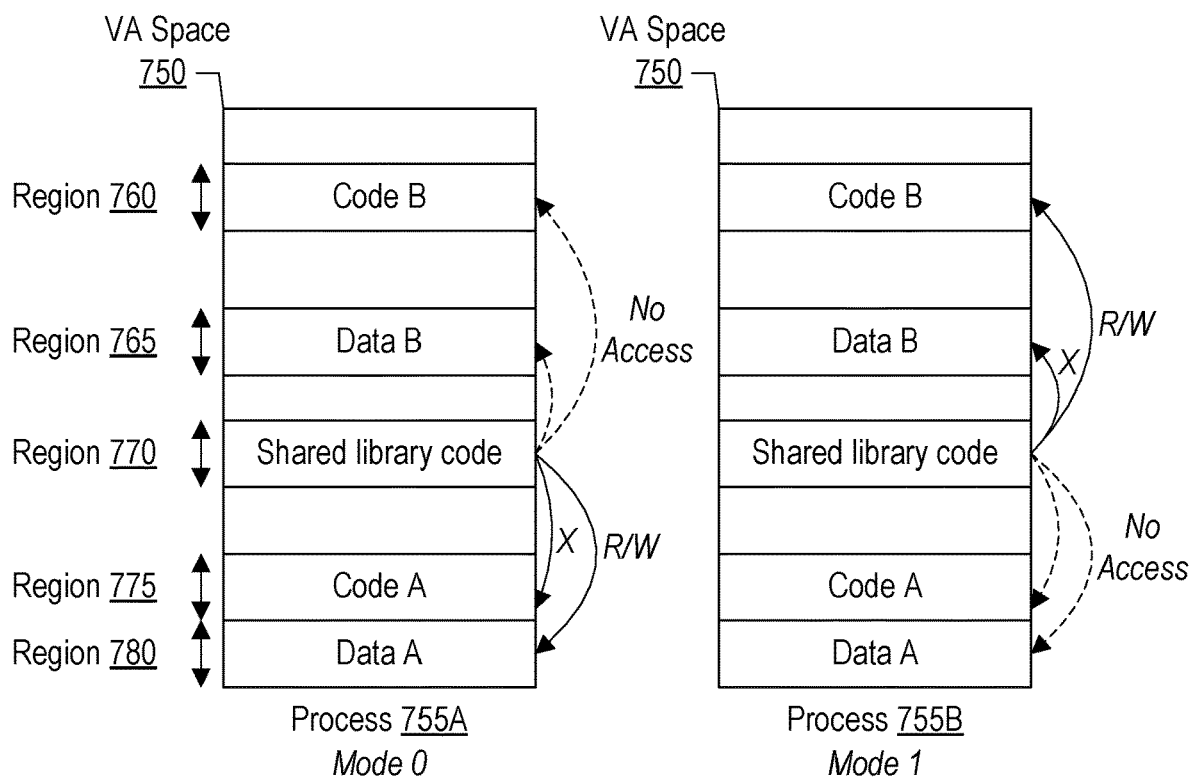
FIG. 7B is a block diagram illustrating another example of PC-based virtual address permissions within a virtual address space in two different execution modes.

FIG. 7B is an example of using mode-based permissions for executing library code that is shared between two processes 755A and 755B. As shown, VA space 750 includes code A and data A respectively at VA regions 775 and 780, code B and data B respectively at VA regions 760 and 765, and shared library code at VA region 770. Notably, code A and data A belong to process 755A, code B and data B belong to process 755B, while shared library code is used by both processes 755A-B.

FIG. 7B shows access permissions changing according to different modes. As shown, executing instructions in mode 0 evaluates to shared library code having read/write permissions to data A and execute permissions to code A of process 755A, but no permissions to either code B or data B of process 755B. Conversely, executing instructions in mode 1 evaluates to shared library code having permissions to code B and data B of process 755B, but no permissions to code A and data A of process 755A.

This approach allows, for example, to protect the data and code of one process from being accessed by the other process via shared library code. For example, if code A of process 755A (executing in mode 0) were to execute shared library code to access data B of process 755B, the processor would block access to data B, as shared library code has no permissions to that data under mode 0. Note that further safeguards may be implemented to prevent unauthorized mode changes that would circumvent these permissions. For example, values of mode transition table 632 (not shown) may be modified to prevent code A and shared library code from changing modes from mode 0 to mode 1 to access data B, and conversely prevent code B and shared library code from changing modes from mode 1 to mode 0 to access data A. In some embodiments, evaluations of these permissions are performed by processor 10 using one or more permission tables (e.g., LUTs 520) using the mode, the source, and the destination VA of each instruction.

Example Methods

Figure 8A:
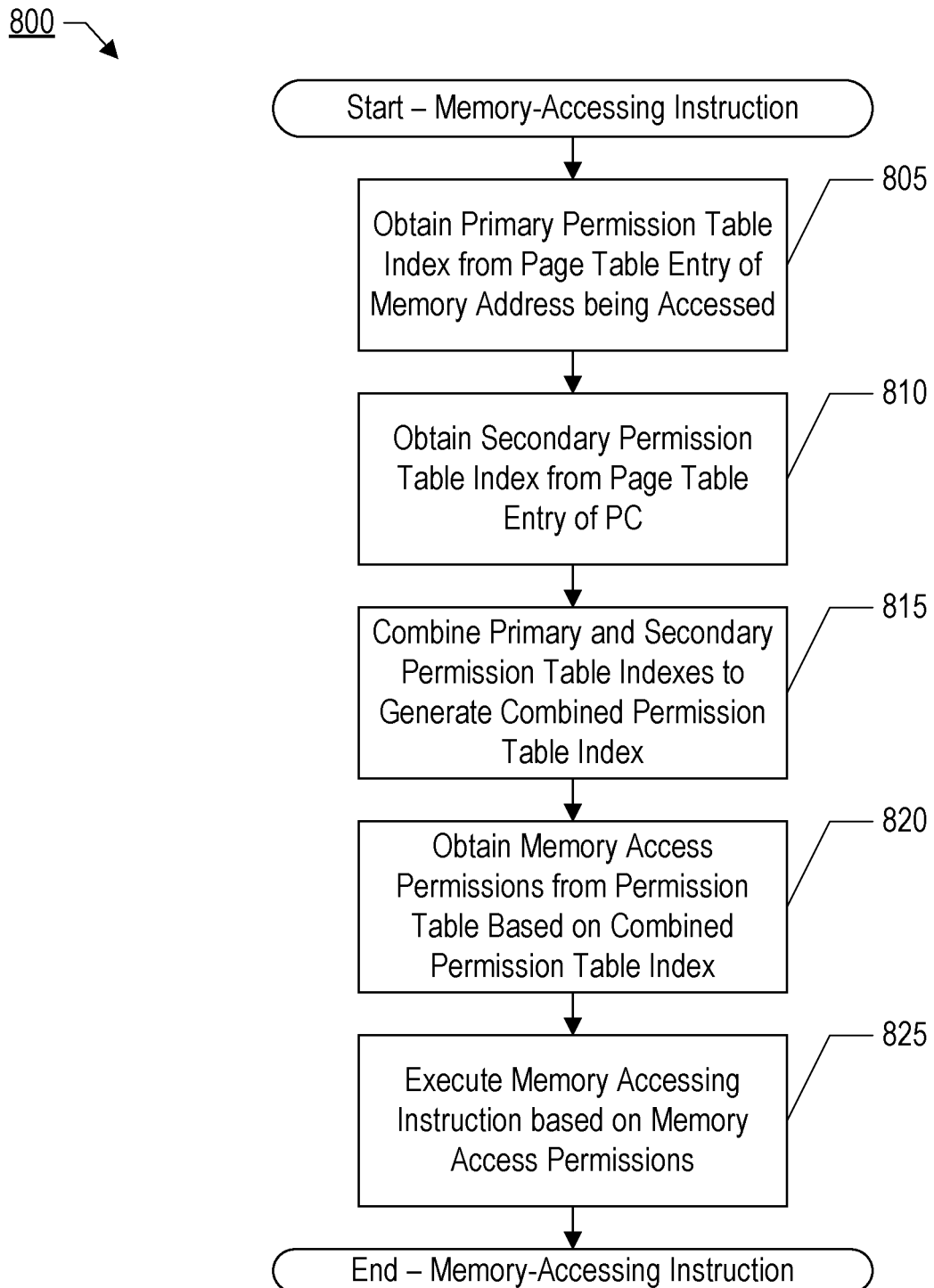
FIG. 8A is a flow diagram of one embodiment of a method for enforcing permissions for a memory-accessing instruction.

FIG. 8A is a flowchart shown illustrating one embodiment of operation of processor 10 for a memory accessing instruction, labeled as method 800. While the blocks are shown in a particular order for ease of understanding, other orders may be used. Blocks may be performed in parallel in combinatorial logic circuitry in the processor 10. Blocks, combinations of blocks, and/or the flowchart as a whole may be pipelined over multiple clock cycles. The processor 10 and/or portions thereof may be configured to implement the operation illustrated in FIG. 8A.

The processor 10 may obtain the primary permission table index from the page table entry of the memory address being accessed (block 805). The primary permission table index may be indirectly obtained if the memory address is a hit in the TLB 26, or may be directly read in a table walk if the memory address is a miss in the TLB 26. The processor 10 may obtain the secondary permission index from the page table entry of the PC (directly or indirectly from the TLB 26—block 810). It is noted that the secondary permission index may be obtained at the time of fetching the instruction, whereas the primary permission table index may be obtained during instruction execution, in some embodiments.

The processor 10 may combine the primary and secondary permission indexes to generate the combined permission table index (block 815). The processor 10 may obtain the memory access permissions from the permission table 20 based on the combined permission table index (block 820). The processor 10 may execute the memory-accessing instruction based on the memory access permissions provided from the permission table 20 (block 825).

Figure 8B:
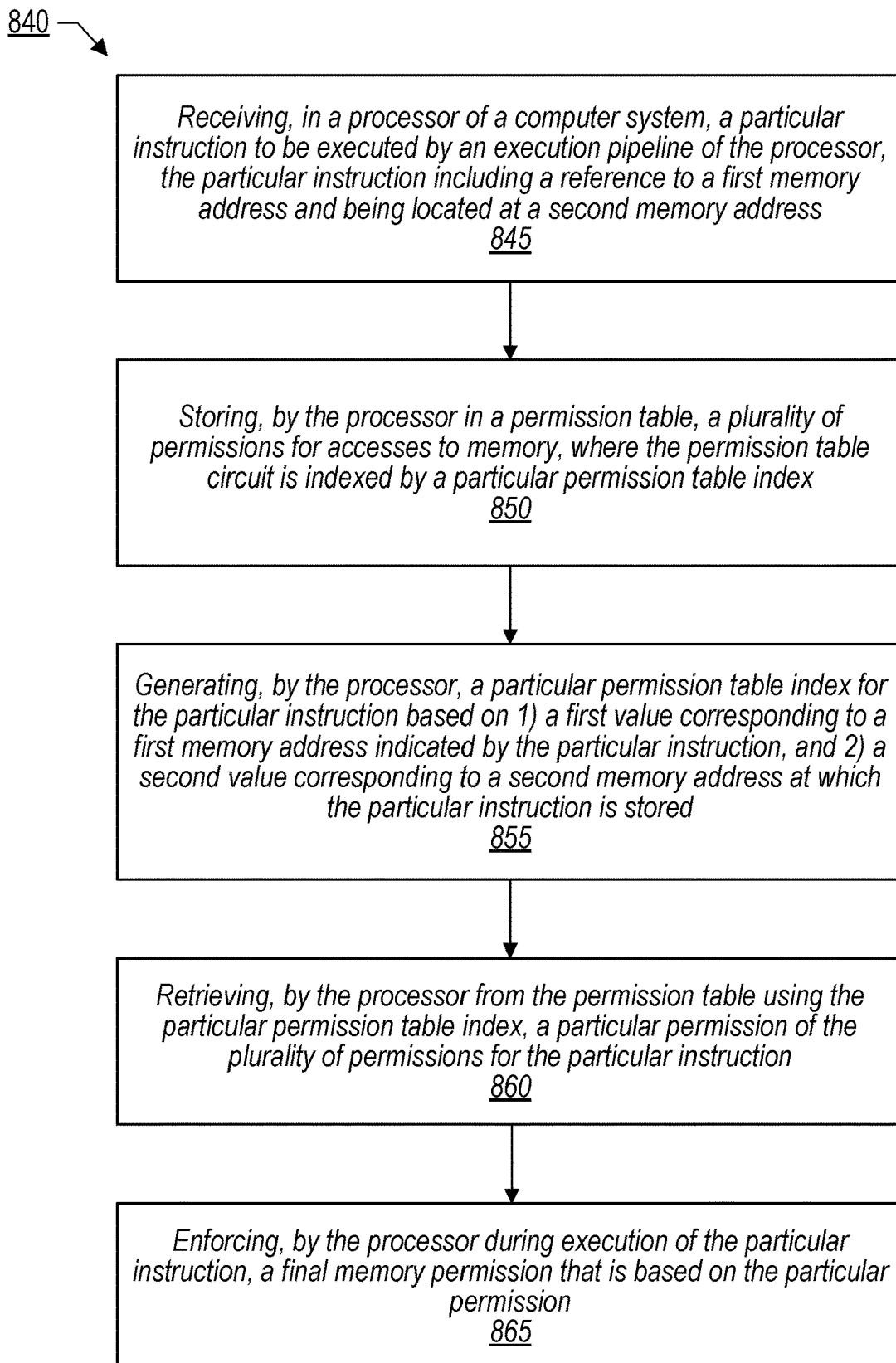
FIG. 8B is a flow diagram of one embodiment of another method for enforcing permissions for a memory-accessing instruction.

FIG. 8B is a flow diagram of one embodiment of a method 840 for providing instruction memory access permissions. In one embodiment, method 840 is performed by a processor such as processor 10. Method 840 can be performed to provide memory permissions for multiple instruction types, including control flow instructions (e.g., instruction 432) and memory-accessing instructions (e.g., instruction 442).

Method 840 commences in step 845, in which a processor (e.g., processor 10) of a computer system (e.g., system 100), receives a particular instruction to be executed by an execution pipeline (e.g., of execution core 12) of the processor, the particular instruction including a reference to a first memory address and being located at a second memory address.

Method 840 continues in step 850, in which the processor stores, in a permission table (e.g., permission table 20) a plurality of permissions for accesses to memory, where the permission table circuit is indexed by a particular permission table index (e.g., PTI 38). In some embodiments, the permission table may define two or more different memory permissions for accessing a particular memory location from different code locations.

Next, in step 855, the processor generates a particular permission table index for the particular instruction based on 1) a first value corresponding to a first memory address indicated by the particular instruction, and 2) a second value corresponding to a second memory address at which the particular instruction is stored.

The first and second values may be stored in one or more permission tables. In some cases, the first value is stored in a page table in association with a first physical page number to which the first memory address translates, and the second value is stored in the page table in association with a second physical page number to which the second memory address translates. The first and second values may be additionally or alternatively cached in one or more additional elements: in some embodiments, the first and second values are stored in a TLB coupled to the processor.

In some embodiments, the processor generates the particular permission table index by concatenating the first value and the second value. That permission table index may be a secondary index that the processor uses to access a particular set of permissions from the permission table. Furthermore, the processor may also generate a primary index for the particular instruction based on a third value corresponding to the first memory address, use the primary index to retrieve a base set of memory permissions from the permission table circuit and to use the secondary index to retrieve a permission mask from the permission table circuit, and combine the base set of memory permissions and the permission mask to obtain a final set of memory permissions for the instruction.

In some embodiments, the particular instruction is a control flow instruction, and the second memory address is a target of the control flow instruction. In such cases, the processor may, in response to the target of the control flow instruction being a load-store instruction, generate a different permission table index for the target of the control flow instruction based on a third value corresponding to a third memory address accessed by the target of the control flow instruction, and a fourth value corresponding to a fourth memory address at which the target of the control flow instruction is stored.

Next, in step 860, the processor retrieves, using the particular permission table index (e.g., via page tables 28), a particular permission of the plurality of permissions for the particular instruction.

The retrieval may, in some embodiments, include selecting the permission table from a set of permission table based on a current execution mode of the processor, and accessing the selected permission table using the particular permission table index to retrieve the particular permission. The execution mode and particular permission table index may be from a previous clock cycle of the processor. When using modes, the processor may further include a mode checking circuit configured to determine whether a mode change specified by instruction is permitted before disseminating a new mode value throughout the execution pipeline.

The processor may use additional tables to retrieve more permissions. For example in some embodiments, the processor further uses a secondary execution privileges table circuit that stores a plurality of secondary execution privilege values. In that case, the secondary execution privileges table is indexed by a particular secondary execution privileges index corresponding to a particular instruction to provide a particular secondary execution privileges value for the particular instruction, the particular secondary execution privileges value defines a permissible set of a plurality of instruction groups that are executable from the second memory address, and the processor is configured to selectively permit the computer processor to execute the particular instruction when the particular instruction is in the permissible set of the plurality of instruction groups defined by the secondary execution privileges value. Furthermore, the particular secondary execution privileges index may be associated with a particular page table entry to which the second memory address is mapped, and the control circuit is further configured to selectively permit the computer processor to execute the particular instruction based on a primary execution privilege associated with the particular page table entry. In some embodiments, the processor uses a plurality of permission tables that specify different permissions for the particular instruction. Then, the processor may obtain permissions for the particular instruction by selecting, based on an execution mode of the computer processor, one of the plurality of permission tables and retrieving the permissions for the particular instruction from the selected permission table using the particular permission table index.

Next, in step 865, the processor enforces, during execution of the particular instruction, a final memory permission that is based on the particular permission.

Additionally in some embodiments, the particular permission is a permission mask, and the processor may further determine a base memory permission from a permission table lookup that is based on a third value corresponding to the first memory address and generate the final permission from the base memory permission and the particular permission. The processor may also determine an execute permission for the particular instruction from a permission table lookup that is based on a fourth value corresponding to the second memory address. Additionally, or alternatively, the processor may determine and secondary execution privileges for the particular instruction from a permission table lookup that is based on a fifth value corresponding to the second memory address, the secondary execution privileges defining which of a plurality of permission groups are permitted to execute from the second memory address.

Figure 9A:
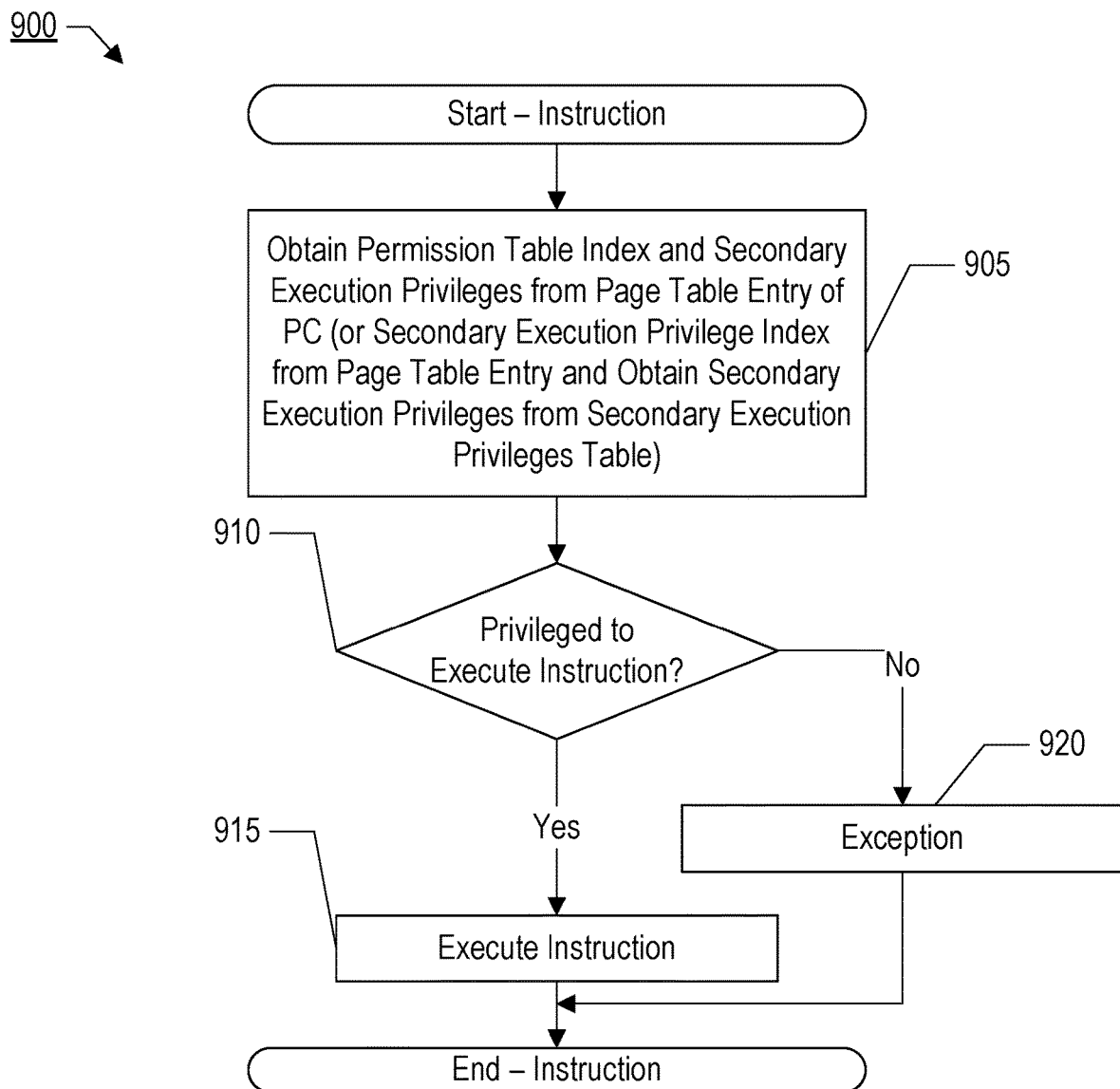
FIG. 9A is a flow diagram of one embodiment of a method for enforcing instruction-group permissions.

Turning now to FIG. 9A, a flowchart is shown illustrating one embodiment of operation of processor 10 instruction execution (labeled as method 900). While the blocks are shown in a particular order for ease of understanding, other orders may be used. Blocks may be performed in parallel in combinatorial logic circuitry in the processor 10. Blocks, combinations of blocks, and/or the flowchart as a whole may be pipelined over multiple clock cycles. The processor 10 and/or portions thereof may be configured to implement the operation illustrated in FIG. 9A.

The processor 10 may obtain a permission index and a secondary execution privileges value from the page table entry of the PC (directly or indirectly through the TLB 26) (block 905). In another embodiment, the page table entry/TLB for the PC may include a secondary execution privileges table index which the processor 10 may use to obtain the secondary execution privileges value. The processor 10 may determine if the processor 10 is privileged to execute the instruction (decision block 910). For example, if the permissions include execute permission and the secondary execution privileges indicate execute permissions for the instruction's group (if any), the processor 10 may be privileged to execute the instruction (decision block 910, "yes" leg and block 915). If the permissions do not include execute permission and/or the secondary execution privileges doe not indicate execute permissions for the instruction's group (if any), the processor 10 may prevent instruction execution (e.g., signaling an exception instead of executing the instruction) (decision block 910, "no" leg and block 920).

In another embodiment, the actual permissions (AP) may be determined in any of the following ways: Given PC1, PC2 (PC primary and secondary indexes) and T1, T2 (Target primary and secondary indexes), there are various methods for determining actual permissions (AP), for example (where # is concatenation and & is bitwise AND):

AP=LUT2(T1 #PC2)
AP=LUT1(T1) & LUT2(T1 #PC2)
AP=LUT1(T1) & LUT2(T2 #PC2)

Where LUT1(T1) is looking-up the primary permissions, modified by LUT2 (bitwise AND-ed).

Figure 9B:
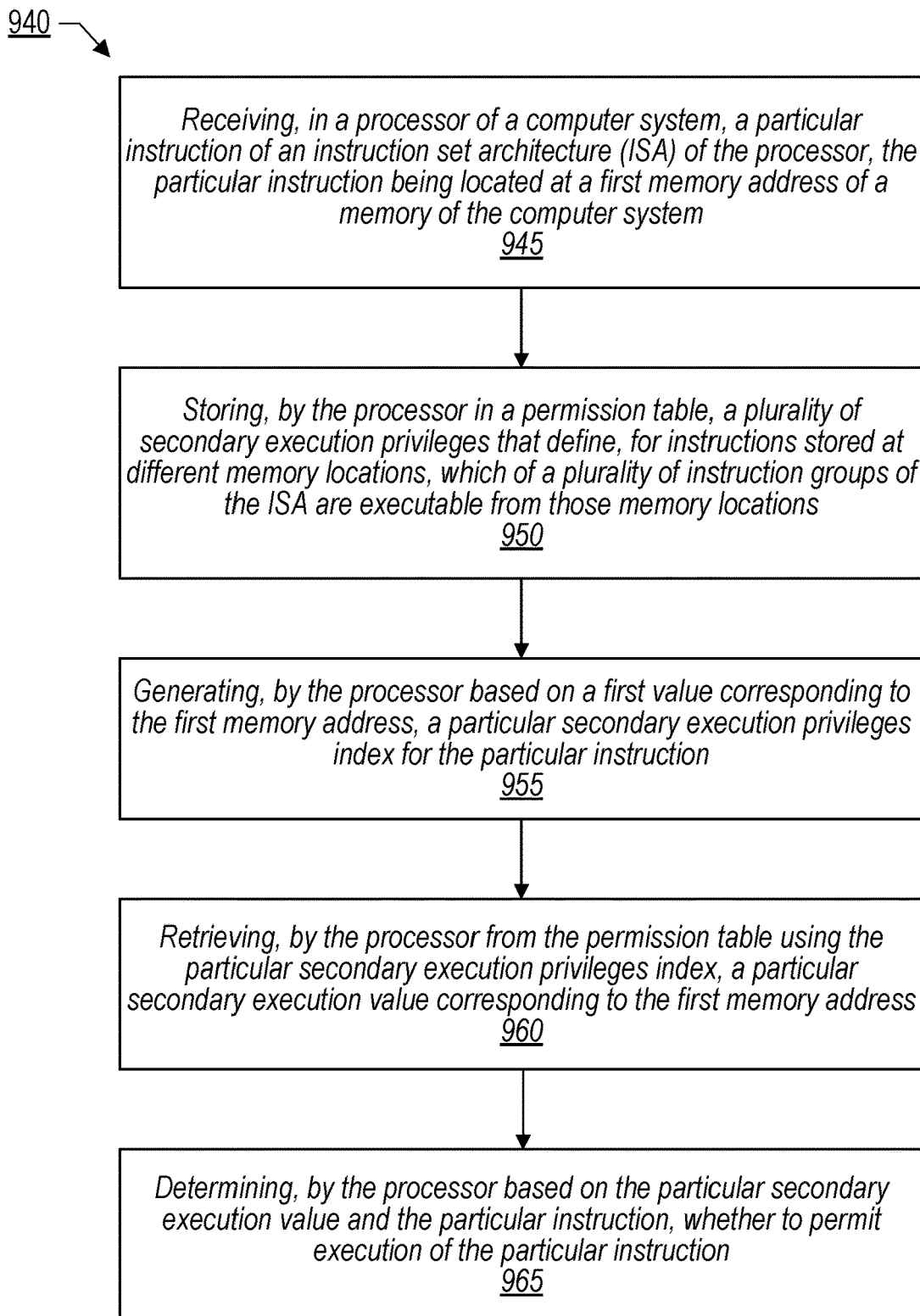
FIG. 9B is a flow diagram of one embodiment of another method for enforcing instruction-group permissions.

FIG. 9B is a flow diagram of one embodiment of a method 940 for providing instruction memory access permissions. In one embodiment, method 940 is performed by a processor such as processor 10. Method 940 can be performed to provide memory permissions for multiple instruction types, including control flow instructions (e.g., instruction 431) and memory-accessing instructions (e.g., instruction 441).

Method 940 commences in step 945, in which a processor (e.g., processor 10) of a computer system (e.g., system 100) receives a particular instruction of an instruction set architecture (ISA) of the processor, the particular instruction being located at a first memory address of a memory of the computer system.

Method 940 continues in step 950, in which the processor stores, in a permission table (e.g., permission table 20) a plurality of secondary execution privileges that define, for instructions stored at different memory locations, which of a plurality of instruction groups of the ISA are executable from those memory locations.

Next, in step 955, the processor generates a particular secondary execution privileges index for the particular instruction. In some embodiments, the particular secondary execution privileges index is associated with a page table entry to which the first memory address is mapped. The processor may further selectively permit executing the particular instruction based on a primary execution privilege associated with the page table entry.

Method 940 continues in step 960, in which the processor retrieves, using the particular secondary execution privileges index (e.g., via page tables 28), a particular secondary execution privileges value corresponding to the first memory address. In some embodiments, the particular secondary execution privileges value is stored in a particular permission table of a plurality of permission tables, and the processor may select the particular permission table based on an execution mode of the processor. Furthermore, the control circuit may include a mode checking circuit configured to determine whether a mode-changing instruction is authorized before changing the execution mode of the processor.

Next, in step 965, the processor determines based on the particular secondary execution privileges value and the particular instruction, whether to permit execution of the particular instruction. In some embodiments, the processor may permit executing the particular instruction based on the particular secondary execution privileges value indicating execution privilege for the given instruction group, but may prevent executing the particular instruction based on the particular secondary execution privileges value indicating no execution privilege for the particular instruction group. The processor may further cause an exception to be signaled in response to the particular secondary execution privileges value indicating no execution privilege for the particular instruction.

In some embodiments, the determining is also based on a primary execution permission obtained using a primary index to index into a lookup table, the primary index being obtained using the first memory address. For example, the primary execution permission may indicate whether any code is permitted to execute at the first memory address, the particular secondary execution privileges value may indicate which instruction groups of the ISA are permitted to execute at the first memory address. The determining may thus include satisfying both the primary execution permission and the particular secondary execution privileges value.

Method 940 may include more steps than shown. For example, the method may further comprise modifying, by the processor, the permission table to change which of the plurality of instruction groups are executable from the first memory address.

Method 940 may include additional permission types. For example, the processor may further enforce a memory permission in response to the particular instruction being a memory-accessing instruction indicated by the particular secondary execution privileges value as being executable. The control may obtain the memory permission using a memory permission index that is generated based on the first memory address and a target memory address specified by the memory-accessing instruction.

Example Device

Figure 10:
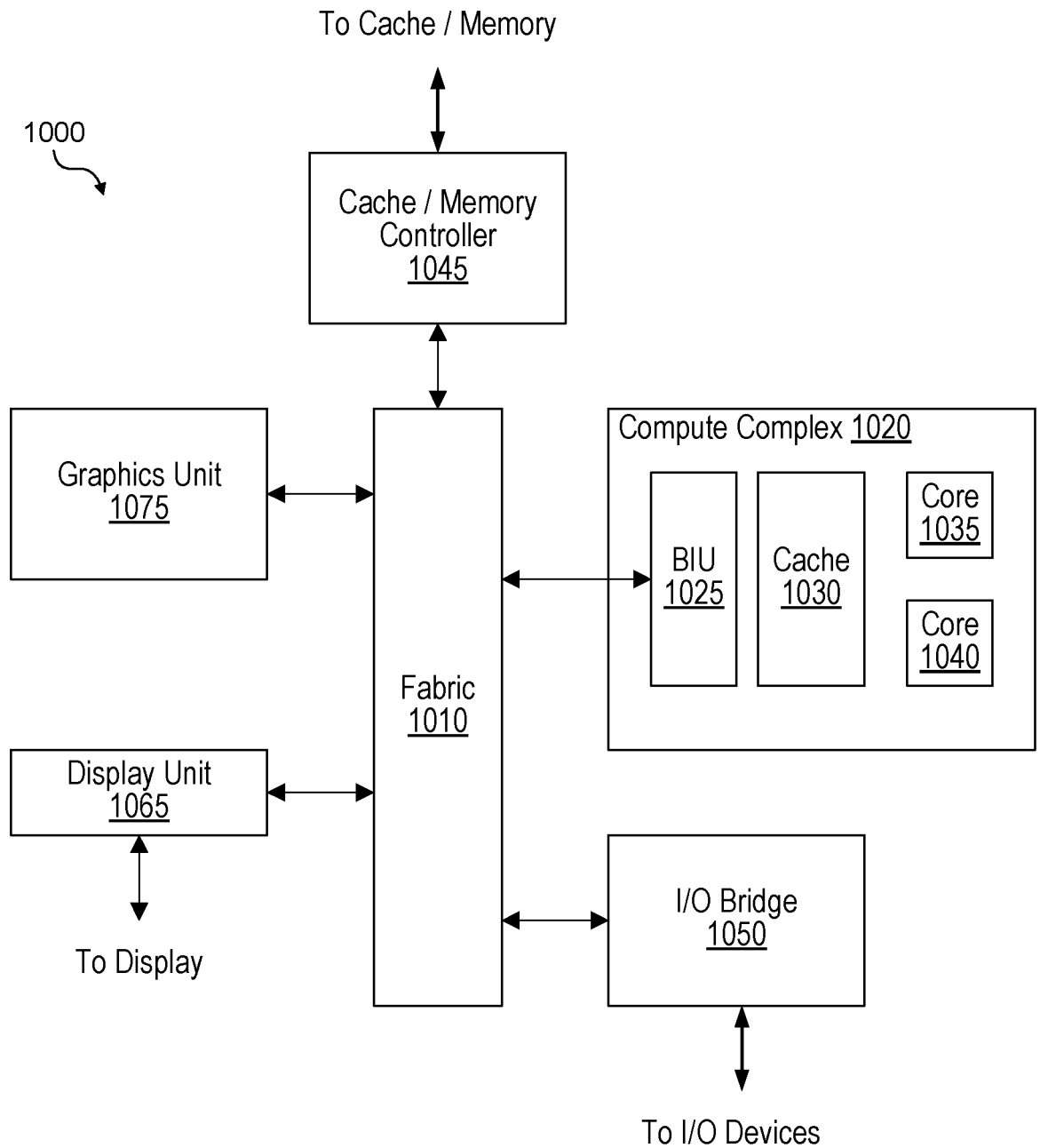
FIG. 10 is a block diagram illustrating an example computing device for implementing the disclosed techniques.

Referring now to FIG. 10, a block diagram illustrating an example embodiment of a device 1000 is shown. In some embodiments, device 1000 may implement functionality of processor 10 and/or circuit 600. In some embodiments, elements of device 1000 may be included within a system on a chip. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1075, and display unit 1065. In some embodiments, device 1000 may include other components (not shown) in addition to or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions. These instructions may be stored in computer readable medium such as a memory coupled to memory controller 1045 discussed below.

As used herein, the term "coupled to" may indicate one or more connections between elements, and a coupling may include intervening elements. For example, in FIG. graphics unit 1075 may be described as "coupled to" a memory through fabric 1010 and cache/memory controller 1045. In contrast, in the illustrated embodiment of FIG. 10, graphics unit 1075 is "directly coupled" to fabric 1010 because there are no intervening elements.

Cache/memory controller 1045 may be configured to manage transfer of data between fabric 1010 and one or more caches and memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches. Memory coupled to controller 1045 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1045 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1020 to cause the computing device to perform functionality described herein.

Graphics unit 1075 may include one or more processors, e.g., one or more graphics processing units (GPUs). Graphics unit 1075 may receive graphics-oriented instructions, such as OPENGL®, Metal®, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related).

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and interintegrated circuit (I2C), for example. Various types of peripherals and devices may be coupled to device 1000 via I/O bridge 1050.

In some embodiments, device 1000 includes network interface circuitry (not explicitly shown), which may be connected to fabric 1010 or I/O bridge 1050. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1000 with connectivity to various types of other devices and networks.

Example Applications

Figure 11:
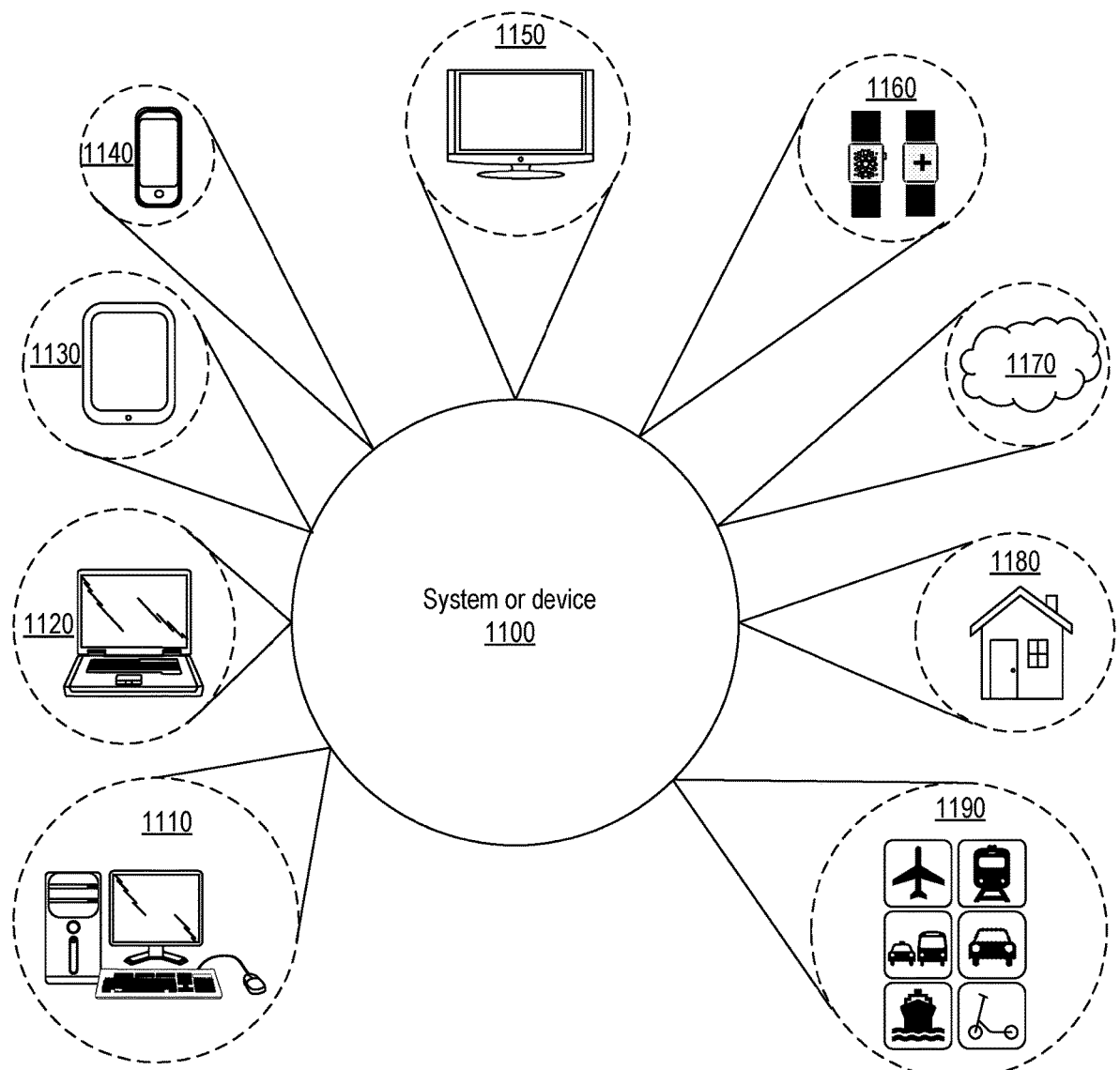
FIG. 11 is a diagram illustrating example applications for systems and devices employing the disclosed techniques.

Turning now to FIG. 11, various types of systems that may include any of the circuits, devices, or system discussed above. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 12:
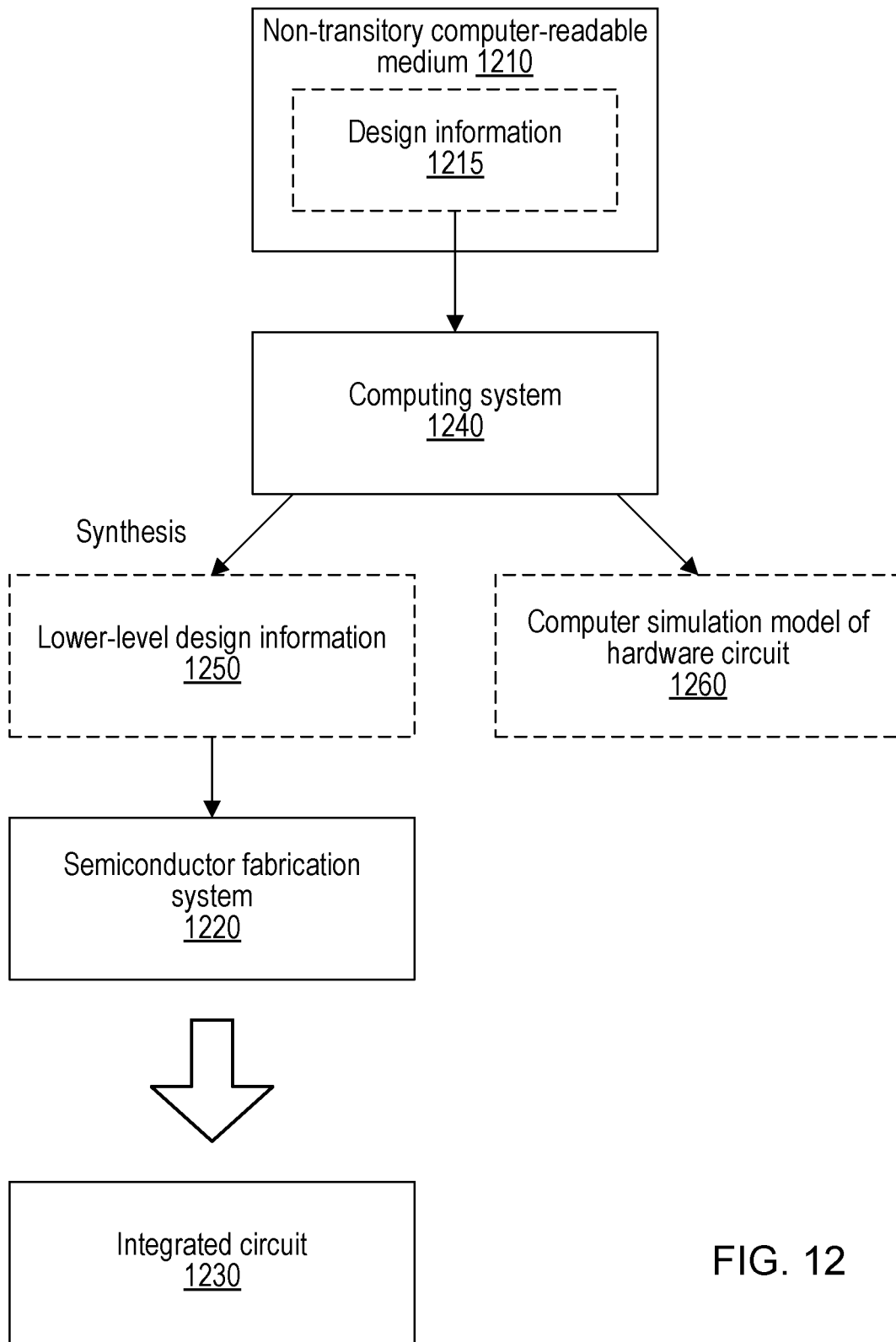
FIG. 12 is a block diagram illustrating an example computer-readable medium that stores circuit design information for implementing devices that employ the disclosed techniques.

FIG. 12 is a block diagram illustrating an example non-transitory computer-readable storage medium that stores circuit design information, according to some embodiments. In the illustrated embodiment, computing system 1240 is configured to process the design information. This may include executing instructions included in the design information, interpreting instructions included in the design information, compiling, transforming, or otherwise updating the design information, etc. Therefore, the design information controls computing system 1240 (e.g., by programming computing system 1240) to perform various operations discussed below, in some embodiments.

In the illustrated example, computing system 1240 processes the design information to generate both a computer simulation model of a hardware circuit 1260 and lower-level design information 1250. In other embodiments, computing system 1240 may generate only one of these outputs, may generate other outputs based on the design information, or both. Regarding the computing simulation, computing system 1240 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1240 also processes the design information to generate lower-level design information 1250 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1250 (potentially among other inputs), semiconductor fabrication system 1220 is configured to fabricate an integrated circuit 1230 (which may correspond to functionality of the simulation model 1260). Note that computing system 1240 may generate different simulation models based on design information at various levels of description, including information 1250, 1215, and so on. The data representing design information 1250 and model 1260 may be stored on medium 1210 or on one or more other media.

In some embodiments, the lower-level design information 1250 controls (e.g., programs) the semiconductor fabrication system 1220 to fabricate the integrated circuit 1230. Thus, when processed by the fabrication system, the design information may program the fabrication system to fabricate a circuit that includes various circuitry disclosed herein.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Accordingly, non-transitory computer-readable storage medium 1210 may include two or more memory media; such media may reside in different locations—for example, in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1240, semiconductor fabrication system 1220, or both. In some embodiments, design information may also include one or more cell libraries that specify the synthesis, layout, or both of integrated circuit 1230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 and model 1260 are configured to operate according to a circuit design specified by design information 1215, which may include performing any of the functionality described herein. For example, integrated circuit 1230 may include any of various elements shown in FIGS. 1, 6A-C. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1220 to fabricate integrated circuit 1230.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a processor that includes:
a permission table circuit configured to store a plurality of secondary execution privileges, wherein the permission table circuit is indexed by a particular secondary execution privileges index corresponding to a particular instruction to provide a particular secondary execution privileges value for the particular instruction that defines which of a plurality of instruction groups of an instruction set architecture (ISA) of the processor are executable from a first memory address at which the particular instruction is stored; and
a control circuit coupled to the permission table circuit and configured to selectively permit the processor to execute the particular instruction when the particular instruction is in a particular instruction group indicated by the particular secondary execution privileges value as being executable.

2. The apparatus of claim 1, wherein the control circuit is configured to permit the processor to execute the particular instruction based on the particular secondary execution privileges value indicating execution privilege for the particular instruction group, and wherein the control circuit is configured to prevent the processor from executing the particular instruction based on the particular secondary execution privileges value indicating no execution privilege for the particular instruction group.

3. The apparatus of claim 2, wherein the control circuit is configured to cause an exception to be signaled in response to the particular secondary execution privileges value indicating no execution privilege for the particular instruction.

4. The apparatus of claim 1, wherein the particular secondary execution privileges index is associated with a page table entry to which the first memory address is mapped.

5. The apparatus of claim 4, wherein the control circuit is further configured to selectively permit the processor to execute the particular instruction based on a primary execution privilege associated with the page table entry.

6. The apparatus of claim 1, wherein the control circuit is further configured to enforce a memory permission in response to the particular instruction being a memory-accessing instruction indicated by the particular secondary execution privileges value as being executable, wherein the control circuit is configured to obtain the memory permission using a memory permission index that is generated based on the first memory address and a target memory address specified by the memory-accessing instruction.

7. The apparatus of claim 1, wherein the particular secondary execution privileges value is stored in a particular permission table of a plurality of permission tables, wherein the control circuit is configured to select the particular permission table based on an execution mode of the processor.

8. The apparatus of claim 7, wherein the control circuit includes a mode checking circuit configured to determine whether a mode-changing instruction is authorized before changing the execution mode of the processor.

9. The apparatus of claim 1, wherein the control circuit is configured to determine that the particular instruction is in the particular instruction group indicated by the particular secondary execution privileges value based on an opcode of the particular instruction and a mapping of opcodes of the ISA to instruction groups.

10. The apparatus of claim 1, wherein the control circuit is configured to write to the permission table circuit to change a set of instruction groups specified as executable at the first memory address.

11. A method, comprising:
receiving, in a processor of a computer system, a particular instruction of an instruction set architecture (ISA) of the processor, the particular instruction being located at a first memory address of a memory of the computer system;
storing, by the processor in a permission table, a plurality of secondary execution privileges that define, for instructions stored at different memory locations, which of a plurality of instruction groups of the ISA are executable from those memory locations;
generating, by the processor based on a first value corresponding to the first memory address, a particular secondary execution privileges index for the particular instruction;
retrieving, by the processor from the permission table using the particular secondary execution privileges index, a particular secondary execution privileges value corresponding to the first memory address; and
determining, by the processor based on the particular secondary execution privileges value and the particular instruction, whether to permit execution of the particular instruction.

12. The method of claim 11, wherein the determining is also based on a primary execution permission obtained using a primary index to index into a lookup table, the primary index being obtained using the first memory address.

13. The method of claim 12, wherein the primary execution permission indicates whether any code is permitted to execute at the first memory address, wherein the particular secondary execution privileges value indicates which instruction groups of the ISA are permitted to execute at the first memory address, and wherein the determining includes satisfying both the primary execution permission and the particular secondary execution privileges value.

14. The method of claim 11, wherein the permission table is selected from a plurality of permission tables using an execution mode of the processor.

15. The method of claim 11, further comprising:
modifying, by the processor, the permission table to change which of the plurality of instruction groups are executable from the first memory address.

16. An apparatus, comprising:
a processor configured to:
receive, at an execution pipeline, a particular instruction for execution, the particular instruction being located at a first virtual memory address;
access, using the first virtual memory address, an entry of a page table, the entry storing a physical page number to which the first virtual memory address maps and an indication of a particular secondary execution privileges value that specifies which of a plurality of instruction groups of an instruction set architecture (ISA) of the processor are permitted to be executed at the first virtual memory address; and determine, based on the particular secondary execution privileges value and a determination of which instruction group the particular instruction belongs to, whether to permit execution of the particular instruction.

17. The apparatus of claim 16, wherein the processor is further configured to use a primary execution privilege to determine whether to permit execution of the particular instruction, the primary execution privilege being accessed from a lookup table using a primary index stored in the entry of the page table.

18. The apparatus of claim 17, wherein the indication of the particular secondary execution privileges value is a secondary index into a particular one of a plurality of secondary execution privileges tables, the particular secondary execution privileges table being selected by a mode value indicative of an execution mode of the processor, the secondary index specifying a location in the particular secondary execution privileges table that stores the particular secondary execution privileges value.

19. The apparatus of claim 16, wherein the processor is configured, in response to the particular instruction being a memory-accessing instruction, to enforce a memory permission by:

generating a memory permission index based on the first virtual memory address and a target virtual memory address specified by the particular instruction;

retrieving a memory permission value using the memory permission index; and enforcing the memory permission value for the particular instruction.

20. The apparatus of claim 16, wherein the processor is configured to signal an exception instead of permitting the particular instruction to execute based on a determination from the particular secondary execution privileges value that an instruction group of the particular instruction is not permitted to execute from the first virtual memory address.

* * * * *